United States Patent
Na et al.

(10) Patent No.: US 11,792,627 B2
(45) Date of Patent: Oct. 17, 2023

(54) METHOD AND APPARATUS FOR MANAGING RESOURCES AND PERFORMING RESOURCE OFFLOADING IN M2M SYSTEM

(71) Applicants: Hyundai Motor Company, Seoul (KR); Kia Corporation, Seoul (KR)

(72) Inventors: Young Jin Na, Gyeonggi-do (KR); Min Byeong Lee, Gyeonggi-do (KR); Jae Seung Song, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 339 days.

(21) Appl. No.: 17/294,893

(22) PCT Filed: Nov. 27, 2019

(86) PCT No.: PCT/KR2019/016435
§ 371 (c)(1),
(2) Date: May 18, 2021

(87) PCT Pub. No.: WO2020/111759
PCT Pub. Date: Jun. 4, 2020

(65) Prior Publication Data
US 2022/0007163 A1 Jan. 6, 2022

Related U.S. Application Data

(60) Provisional application No. 62/803,799, filed on Feb. 11, 2019, provisional application No. 62/771,836, filed on Nov. 27, 2018.

(51) Int. Cl.
*H04W 4/00* (2018.01)
*H04J 3/00* (2006.01)
(Continued)

(52) U.S. Cl.
CPC .......... *H04W 4/70* (2018.02); *H04L 67/1029* (2013.01); *H04L 67/1074* (2013.01);
(Continued)

(58) Field of Classification Search
CPC ..... H04W 4/70; H04W 48/18; H04W 56/001; H04L 67/51; H04L 67/1029; H04L 67/1074; H04L 67/1095
(Continued)

(56) References Cited

U.S. PATENT DOCUMENTS

2015/0373583 A1 12/2015 Yousefi et al.
2016/0302085 A1* 10/2016 Park ................. H04W 4/70
(Continued)

FOREIGN PATENT DOCUMENTS

EP 3820118 A1 5/2021
KR 2010-0005431 A 1/2010
(Continued)

OTHER PUBLICATIONS

REQ-2018-0047; Jul. 24, 2018.
(Continued)

*Primary Examiner* — Mark G. Pannell
(74) *Attorney, Agent, or Firm* — Fox Rothschild LLP

(57) ABSTRACT

A method for performing resource offloading in an M2M system is provided. The method is performed based on an offloaded resource and offloaded attributes. The method includes generating an offloading request message that requests offloading of a source resource. In response to the offloading request message, offloading the source resource for which the offloading is requested. An offloaded resource is then generated using the offloaded source resource. Herein, the offloaded resource includes synchronization modes designating synchronization methods with the offloaded source resource as offloaded attributes.

19 Claims, 31 Drawing Sheets

(51) Int. Cl.
      *H04W 4/70*      (2018.01)
      *H04L 67/1029*   (2022.01)
      *H04L 67/1074*   (2022.01)
      *H04L 67/1095*   (2022.01)
      *H04W 48/18*     (2009.01)
      *H04W 56/00*     (2009.01)
      *H04L 67/51*     (2022.01)

(52) U.S. Cl.
     CPC .......... *H04L 67/1095* (2013.01); *H04L 67/51* (2022.05); *H04W 48/18* (2013.01); *H04W 56/001* (2013.01)

(58) Field of Classification Search
     USPC ......................................................... 370/329
     See application file for complete search history.

(56) References Cited

U.S. PATENT DOCUMENTS

2020/0044760 A1* 2/2020 Seed ...................... H04J 3/0658
2021/0281657 A1* 9/2021 Kim .................... H04L 67/1095

FOREIGN PATENT DOCUMENTS

WO    2015-080401 A1   6/2015
WO     2018067817 A1   4/2018

OTHER PUBLICATIONS

Extended European Search Report for European Patent Application No. 19890721, dated Jul. 6, 2022, 11 pages.

Mavromoustakis, Constandinos X. et al., "Socially Oriented Edge Computing for Energy Awareness in IoT Architectures", IEEE Communications Magazine, vol. 56, No. 7, Jul. 2018, pp. 139-145.

Huang, Liang et al., "Deep Reinforcement Learning for Online Computation Offloading in Wireless Powered Mobile-Edge Computing Networks", Arxiv.org, Cornell University Library, Aug. 6, 2018, 13 pages.

Yamamoto, Kenichi et al., "Vehicular Domain Enablement", oneM2M Partners Type 1, Aug. 13, 2018, pp. 1-154, http://member.onem2m.org/Application/documentapp/downloadimmediate/default.aspx?docID=27616.

* cited by examiner

METHOD AND APPARATUS FOR MANAGING RESOURCES AND PERFORMING RESOURCE OFFLOADING IN M2M SYSTEM

CROSS-REFERENCE TO RELATED APPLICATIONS

This application is a National Phase application filed under 35 USC 371 of PCT International Application No. PCT/KR2019/016435 with an International Filing Date of Nov. 27, 2019, which claims the benefit of U.S. Provisional Application 62/771,836 filed on Nov. 27, 2018 and U.S. Provisional Application 62/803,799 filed on Feb. 11, 2019. The entire contents of these applications are incorporated herein by reference in their entirety.

TECHNICAL FIELD

The present invention relates to a method for resource management. More particularly, the present invention relates to a method and apparatus for performing resource offloading through resource management in a machine-to-machine (M2M) system.

BACKGROUND ART

Recently, introduction of Machine-to-Machine (M2M) system has become active. M2M communication refers to a communication executed between machines without human intervention. M2M may refer to Machine Type Communication (MTC), Internet of Things (IoT) or Device-to-Device (D2D). In the following description, the term "M2M" is uniformly used for convenience of explanation, but the present invention is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

The present invention may provide a method and apparatus for resource management. The present invention may provide a method and apparatus for resource offloading. The present invention may provide a method and apparatus for managing a resource in an M2M system. The present invention may provide a method and apparatus for managing an offloaded resource by offloading by newly defining an offloaded resource type in an M2M system.

The present invention may provide a method and apparatus for managing an offloaded resource by offloading by newly defining offloaded attributes in an M2M system. The present invention may provide a method and apparatus for managing an announced resource by offloading by utilizing an announced resource type in an M2M system. The present invention may provide a method and apparatus for performing resource offloading in an M2M system. The present invention may provide a management policy for resource offloading. The present invention may provide a method and apparatus satisfying requirements for low delay and high reliability through resource offloading.

According to an embodiment of the present invention, a method for performing resource offloading in a first node includes receiving an offloading request message, which requests offloading for a source resource, and offloading, in response to the offloading request message, a source resource, for which offloading is requested, to a second node. The offloading includes a request for generating an offloaded resource by using an offloaded source resource, and the offloaded resource includes a synchronization mode (offloadSync) designating a synchronization method with the offloaded source resource as one of offloaded attributes.

Additionally, according to an embodiment of the present invention, the synchronization mode (offloadSync) includes at least one or more among a periodic mode (Periodic), an update mode (Update), and a termination mode (Finish). In addition, according to an embodiment of the present invention, when the synchronization mode is the periodic mode, the first node and the second node may periodically perform synchronization between the source resource and the offloaded resource at every preset synchronization cycle time.

Accordingly to an embodiment of the present invention, the offloaded resource may further include cycle information (syncTime) designating a synchronization cycle time used in the synchronization mode as an offloaded attribute. Additionally, according to an embodiment of the present invention, when the synchronization mode is the update mode, every time an update is performed for the offloaded resource included in the second node, the first node and the second node may perform synchronization between the source resource and the offloaded resource.

Further, according to an embodiment of the present invention, when the synchronization mode is the termination mode, when the offloaded resource is to be deleted from the second node, the first node and the second node may perform synchronization between the source resource and the offloaded resource. According to an embodiment of the present invention, when the synchronization mode is the termination mode, if an offloading service for the offloaded resource terminates in the second node, the first node and the second node may perform synchronization between the source resource and the offloaded resource.

According to an embodiment of the present invention, the offloading request message includes information designating the source resource, for which offloading is requested, and information designating a second node in which the offloaded resource is generated. According to an embodiment of the present invention, the offloaded source resource may be managed based on a management policy of the first node.

In addition, according to an embodiment of the present invention, the management policy includes a blocking policy, and when the offloaded source resource included in the first node is managed based on the blocking policy, access to the offloaded source resource may be blocked. The management policy includes a readable policy, and when the offloaded source resource included in the first node is managed based on the readable policy, only reading may be allowed for the offloaded source resource.

Further, according to an embodiment of the present invention, the management policy includes a writable policy, and when the offloaded source resource included in the first node is managed based on the writable policy, reading and writing may be allowed for the offloaded source resource. According to an embodiment of the present invention, the offloaded resource may further include link information (Link) designating a link to the offloaded source resource as an offloaded attribute.

Additionally, according to an embodiment of the present invention, the offloaded resource may further include information (syncResponsibility) assigning responsibility for the synchronization mode either to a first node or to a second node as an offloaded attribute. According to an embodiment of the present invention, when the source resource includes attribute information (offloadTo) designating an offloading target node, the offloading request message may designate a second node as the offloading target node by using the attribute information (offloadTo).

According to an embodiment of the present invention, the offloaded resource may be classified into at least two or more offloaded resource types according to a type of a target resource to be offloaded. In addition, according to an embodiment of the present invention, the offloaded resource types may include an access control policy offload (accessControlOffload). The offloaded resource types may further include AE offload (AEOffload) that offloads an application entity (AE) itself.

According to an embodiment of the present invention, at least one or more pieces of information among expirationTime, link, and accessControlPolocyIDs may be included as common offloaded attributes. In addition, according to an embodiment of the present invention, the first node may be an infrastructure node-common service entity (IN-CSE), and the second node may be a middle node-common service entity (MN-CSE). According to an embodiment of the present invention, the first node may be a middle node-common service entity (MN-CSE), and the second node may be an infrastructure node-common service entity (IN-CSE). Additionally, according to an embodiment of the present invention, both the first node and the second node may be an infrastructure node-common service entity (IN-CSE).

A method for performing resource offloading in a second node includes receiving an offloading request for a source resource, for which offloading is requested, from a first node, and generating, in response to the offloading request message, an offloaded resource by using the source resource for which offloading is requested. The offloaded resource includes a synchronization mode (offloadSync) designating a synchronization method with the offloaded source resource as an offloaded attribute.

Additionally, according to an embodiment of the present invention, a method for performing resource offloading in an application entity (AE) includes transmitting an offloading request message, which requests offloading of a source resource within a first node to a second node, to the first node and receiving, according to the offloading request message, information based on an offloaded resource from the second node that generates the offloaded resource by using the offloaded source resource. Herein, the offloaded resource includes a synchronization mode (offloadSync) designating a synchronization method with the offloaded source resource as an offloaded attribute.

A method for performing resource offloading includes creating an offloading request message, which requests offloading for a source resource, offloading, in response to the offloading request message, a source resource for which offloading is requested, and generating an offloaded resource by using the offloaded source resource. The offloaded resource may include attribute information designating a synchronization mode (offloadSync) with the offloaded source resource.

In addition, according to an embodiment of the present invention, a first node apparatus for performing resource offloading includes at least one or more processors and at least one or more memories connected to the at least one or more processors. The at least one or more processors, which are connected operably to the at least one or more memories and execute a program instruction stored in the at least one or more memories, receive an offloading request message requesting offloading for a source resource, request, in response to the offloading request message, offloading of the source resource, for which offloading is requested, to a second node, and request generation of an offloaded resource using an offloaded source resource to the second node. The offloaded resource includes a synchronization mode (offloadSync) designating a synchronization method with the offloaded source resource as an offloaded attribute.

According to an embodiment of the present invention, a second node apparatus for performing resource offloading includes at least one or more processors and at least one or more memories connected to the at least one or more processors. The at least one or more processors, which are connected operably to the at least one or more memories and execute a program instruction stored in the at least one or more memories, receive an offloading request for a source resource, for which offloading is requested, from a first node and generate, in response to the offloading request, an offloaded resource using the source resource for which offloading is requested. The offloaded resource includes a synchronization mode (offloadSync) designating a synchronization method with the offloaded source resource as an offloaded attribute.

In addition, according to an embodiment of the present invention, an application entity apparatus for performing resource offloading includes at least one or more processors and at least one or more memories connected to the at least one or more processors. The at least one or more processors, which are connected operably to the at least one or more memories and execute a program instruction stored in the at least one or more memories, transmit an offloading request message, which requests offloading of a source resource within a first node to a second node, to the first node and receive information based on an offloaded resource from the second node that generates the offloaded resource using the offloaded source resource according to the offloading request message. The offloaded resource includes a synchronization mode (offloadSync) designating a synchronization method with the offloaded source resource as an offloaded attribute.

According to the present invention, a method and apparatus for resource management may be provided. According to the present invention, a method and apparatus for resource offloading may be provided. According to the present invention, a method and apparatus for managing a resource in an M2M system may be provided. According to the present invention, a method and apparatus for performing resource offloading in an M2M system may be provided. According to the present invention, a management policy for resource offloading may be provided. According to the present invention, a method and apparatus satisfying requirements for low delay and high reliability through resource offloading may be provided.

Effects obtained in the present invention are not limited to the above-mentioned effects, and other effects not mentioned above may be clearly understood by those skilled in the art from the following description.

DETAILED DESCRIPTION

Figure 1:
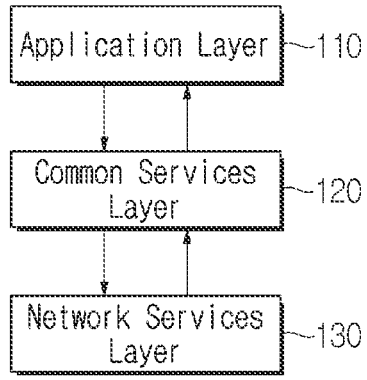
FIG. 1 is a view illustrating a layered structure of a Machine-to-Machine (M2M) system according to the present invention.

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various embodiments are also included in the scope of the present disclosure.

In the following description of the exemplary embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In addition, the present specification describes a network based on Machine-to-Machine (M2M) communication, and a work in M2M communication network may be performed in a process of network control and data transmission in a system managing the communication network. In addition, in the present specification, an M2M terminal may be a terminal performing M2M communication. However, in consideration of backward compatibility, it may be a terminal operating in a wireless communication system. In other words, an M2M terminal may mean a terminal operating based on M2M communication network but is not limited thereto. An M2M terminal may operate based on another wireless communication network and is not limited to the embodiment described above.

In addition, an M2M terminal may be fixed or have mobility. In addition, an M2M server refers to a server for M2M communication and may be a fixed station or a mobile station. In addition, in the present specification, an entity may refer to hardware like M2M device, M2M gateway and M2M server. In addition, for example, an entity may be used to refer to software configuration in a layered structure of M2M system and is not limited to the embodiment described above. In addition, for example, the present invention mainly describes an M2M system but is not solely applied thereto.

In addition, an M2M server may be configured to perform communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other via an M2M gateway. Herein, for example, both an M2M gateway and an M2M server may be M2M terminals and are not limited to the exemplary embodiment described above.

FIG. 1 is a view illustrating a layered structure of an M2M system. Referring to FIG. 1, a layered structure of an M2M system may include an application layer 110, a common services layer 120 and a network services layer 130. Herein, the application layer 110 may be a layer that operates based on a specific application. For example, an application may be a fleet tracking application, a remote blood sugar monitoring application, a power metering application or a controlling application. In other words, an application layer may be a layer for a specific application. Herein, an entity operating based on an application layer may be an application entity (AE).

The common services layer 120 may be a layer for a common service function (CSF). For example, the common services layer 120 may be a layer configured to provide common services like data management, device management, M2M service subscription management and location service. For example, an entity operating based on the common services layer 120 may be a common service entity (CSE). The network services layer 130 may provide the common services layer 120 with services such as device management, location service and device triggering. Herein, an entity operating based on the network services layer 130 may be a network service entity (NSE).

Figure 2:
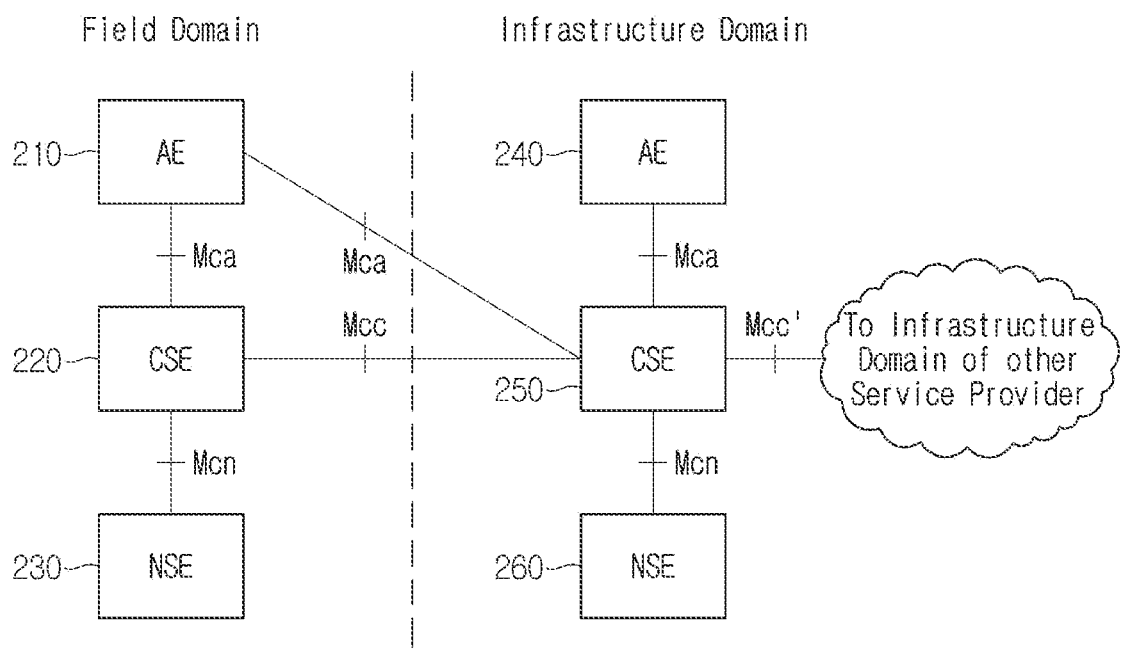
FIG. 2 is a view illustrating reference points according to the present invention.

FIG. 2 is a view illustrating an M2M system structure. Referring to FIG. 2, an M2M system structure may be distinguished into a field domain and an infrastructure domain. Herein, in each domain, each of the entities may be configured to perform communication through a reference point. For example, a reference point may indicate a communication flow between each entity. Herein, referring to FIG. 2, the reference point Mca between AE and CSE, the reference point Mcc between different CSEs and the Mcn reference point between CSE and NSE may be set.

Figure 3:
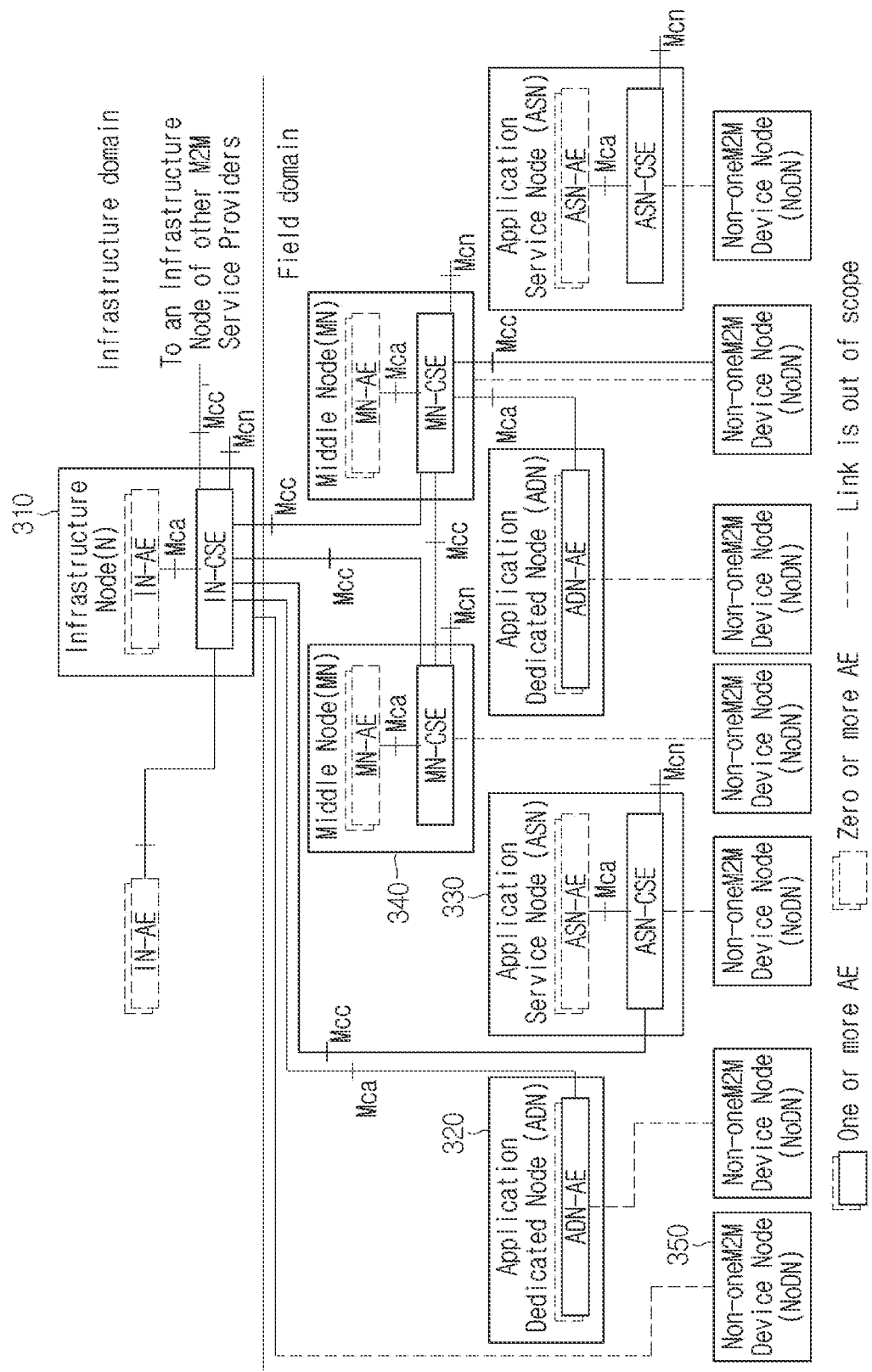
FIG. 3 is a view illustrating each node according to the present invention.

FIG. 3 is a view illustrating the setting of an M2M system structure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node configured to perform communication with the M2M terminal of another infrastructure based on an infrastructure structure. In addition, for example, conceptually, a node may be a logical entity or a software configuration.

Furthermore, an application dedicated node (ADN) 320 may be a node including at least one AE but not CSE. Herein, an ADN may be set in the field domain. In other words, an ADN may be a dedicated node for AE. For example, an ADN may be a node that is set in an M2M terminal in hardware. In addition, an application service node (ASN) 330 may be a node including one CSE and at least one AE. ASN may be set in the field domain. In other words, it may be a node including AE and CSE. Herein, an ASN may be a node connected to an IN. For example, an ASN may be a node that is set in an M2M terminal in hardware.

In addition, a middle node (MN) 340 may be a node including a CSE and including zero or more AEs. Herein, the MN may be set in the field domain. An MN may be connected to another MN or IN based on a reference point. In addition, for example, an MN may be set in an M2M gateway in hardware. In addition, as an example, a non-M2M terminal node 350 (Non-M2M device node, NoDN) is a node that does not include M2M entities. It may be a node that performs management or collaboration together with an M2M system.

Figure 4:
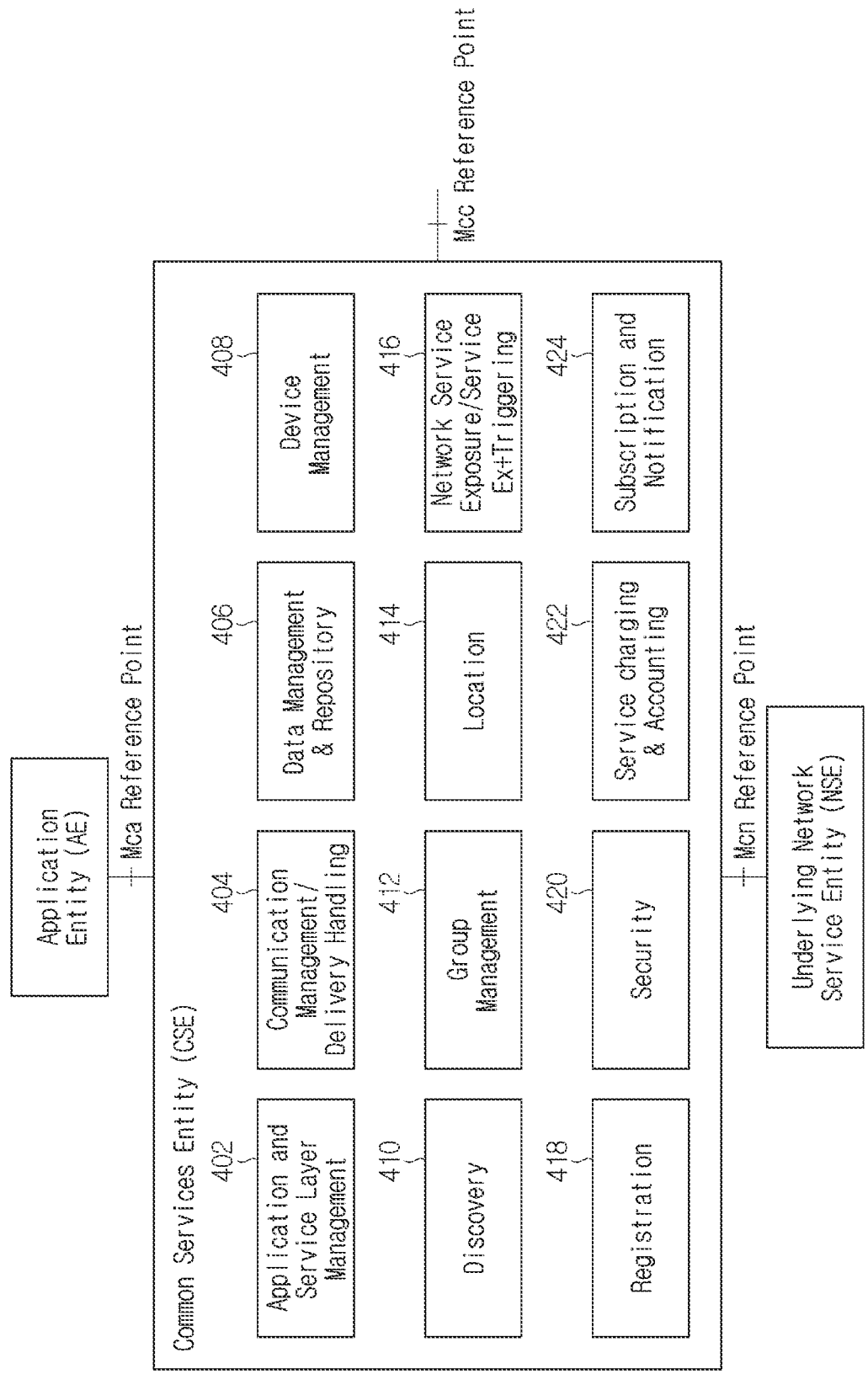
FIG. 4 is a view illustrating a common service function according to the present invention.

FIG. 4 is a view illustrating a common service function. Referring to FIG. 4, common service functions may be provided. For example, a common service function may provide at least any one function among application and service layer management, communication management and delivery handling, data management and repository, device management, discovery, group management, location, network service exposure/service execution and triggering, registration, security, service charging and accounting, service session management, and subscription/notification. Herein, M2M terminals may be configured to operate based on a common service function. In addition, a common service function may be possible in other exemplary embodiments and is not limited to the above-described exemplary embodiment.

In addition, for example, at least any one of an M2M platform, an M2M gateway, an M2M device and an application entity (AE) may be included in an M2M system. For example, an IN may serve as an M2M platform, an MN may serve as an M2M gateway. In addition, an ASN or ADN may be an M2M device and may be configured to operate based on the above description. In addition, for example, a CSE is used as a common functional element of an M2M system and may be configured to perform a common function, as described above. Herein, to implement the function, the CSE may be included in an ASN that is used as an M2M platform, an M2M gateway and an M2M device, as described above. In addition, for example, an AE may be included in any one of an M2M platform, an M2M gateway, an ASN, and an AND. In addition, for example, an AE may be used alone and is not limited to the embodiment described above.

Herein, for example, a hosting common service entity (H-CSE) may be an entity that holds a resource or attribute, and a registrar common service entity (R-CSE) is may be a CSE with a terminal (or M2M terminal) registered therein. Herein, for example, the terminal may be at least one of ADN, ASN and MN. In addition, for example, R-CSE and H-CSE may be at least one or more among ASN, MN and IN.

For example, a terminal may be configured to acquire a resource from a H-CSE through a R-CSE. Meanwhile, a resource may be expressed based on an object operated in an M2M system. For example, a resource may be defined based on terminal operation information for a specific service and may be indicated based on create/retrieve/update/delete (CRUD). For a more specific example, a terminal (or AE) may be configured to obtain attribute information of a resource and a target resource from a H-CSE through a R-CSE. Herein, as described above, the H-CSE may provide the AE with the resource and the attribute information thereof for a specific service. For example, an H-CSE may be a resource server for a special service. For example, a resource server may be a vehicle driving server or a vehicle management server. In other words, a terminal may be configured to obtain information for a specific service from a server based on a resource and operate based on the information. Meanwhile, for example, a CSE in an M2M system may include a transceiver, a processor, and a memory. Based on this, the CSE may be configured to transmit and receive a data packet to and from other nodes to process the data packet. An apparatus configuration will be described later.

In addition, for example, a resource may be configured to store related information through a container and share data with another entity. Herein, the content instance (contentInstance) may be a child resource. In addition, for example, the attribute information of each resource may be a specific description of the resource. Herein, the resource attribute information may be configured to store attribute data of the resource. Based on the above, a terminal (AE) may be configured to obtain a specific resource from an H-CSE through a R-CSE. Herein, the resource may include attribute information as target attribute information. A terminal may be configured to perform an operation for a specific service based on the obtained resource and attribute information.

Figure 5:
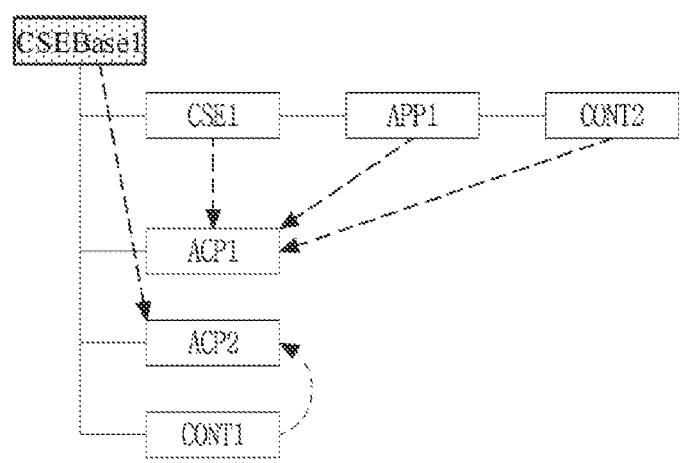
FIG. 5 is a view illustrating a resource structure in CSE according to the present invention.

In addition, for example, FIG. 5 is a view illustrating a resource structure in CSE. Referring to FIG. 5, the "CSE-Base" resource type may be defined in CSE. For example, "CSEBase" may be a tree-structured resource and be a root resource in CSE. Herein, "CSEBase" may include all the other resources. In addition, as an example, "CSE1" in FIG. 5 may be a name of the "remoteCSE" resource type. Herein, the "remoteCSE" resource is a resource existing under "CSEBase" and may include other CSE information registered in the corresponding CSE. In addition, as an example, "APP1" in FIG. 5 may be a name of the AE resource type. In addition, as an example, an original resource of a CSE may be announced to "remoteCSE", which will be described later. Herein, the AE resource type may be a resource existing under the "CaseBase" or "RemoteCSE" resource. Herein, as an example, when an AE resource exists under "CSEBsae", information on an application registered (or connected) to the corresponding CSE may be stored. In addition, as an example, when the AE resource exists under "remoteCSE", it may be an AE existing under another CSE (e.g. CSE 1). In addition, as an example, the "container" resource may be a resource that stores data for each CSE or AE. Herein, as an example, "CONT2" may be a resource that stores data for the application of "APP1". Also, as an example, "CONT1" may be a resource that stores data for the corresponding CSE.

In particular, as an example, "ACP1" and "ACP2" may be names of "accessControlPolicy" resources, respectively. Herein, "accessControlPolicy" may be a resource that stores information related to access authority to a specific resource.

In particular, as an example, "ACP1" may include access authority information for CSE1 and AE registered in CSE1 as another CSE. Herein, authentication for another CSE may be performed via "ACP1". In addition, "ACP2" may include access authority information for the CSE, and authentication for the CSE may be performed. In other words, a resource as described above may be included in the corresponding CSE, and attribute information on this may be defined. Herein, as an example, based on the above, a resource for R-CSE and a resource for a terminal (or AE) registered in R-CSE as "remoteCSE" may be generated and information may be stored in H-CSE.

Particularly, as an example, when operating in the M2M system based on what is described above, a large number of resources and/or tasks may be registered (or connected) to the server (or H-CSE). More specifically, when resources for each CSE (e.g. MN node) and each AE (e.g. terminal) are registered in a server, a load on the server may increase, and thus a smooth operation may be impossible. Based on the above, resource offloading may be required to reduce overhead for a server resource and/or task. In particular, as an example, for what is described above, a terminal (e.g. End IoT device, Edge/Fog) at the bottom needs to support a registered server in real time. As another example, a terminal at the bottom needs to be synchronized with a server and may operate based on this. In the following description, a terminal at the bottom supports a server in real time, as described above, and is capable of being synchronized with the server. However, the present disclosure is not limited thereto. In addition, as an example, the following description may be applied to at least one or more of Vehicle to Everything (V2X), Industrial IoT (IIoT), and Smart Factory, but is not limited thereto.

Figure 6:
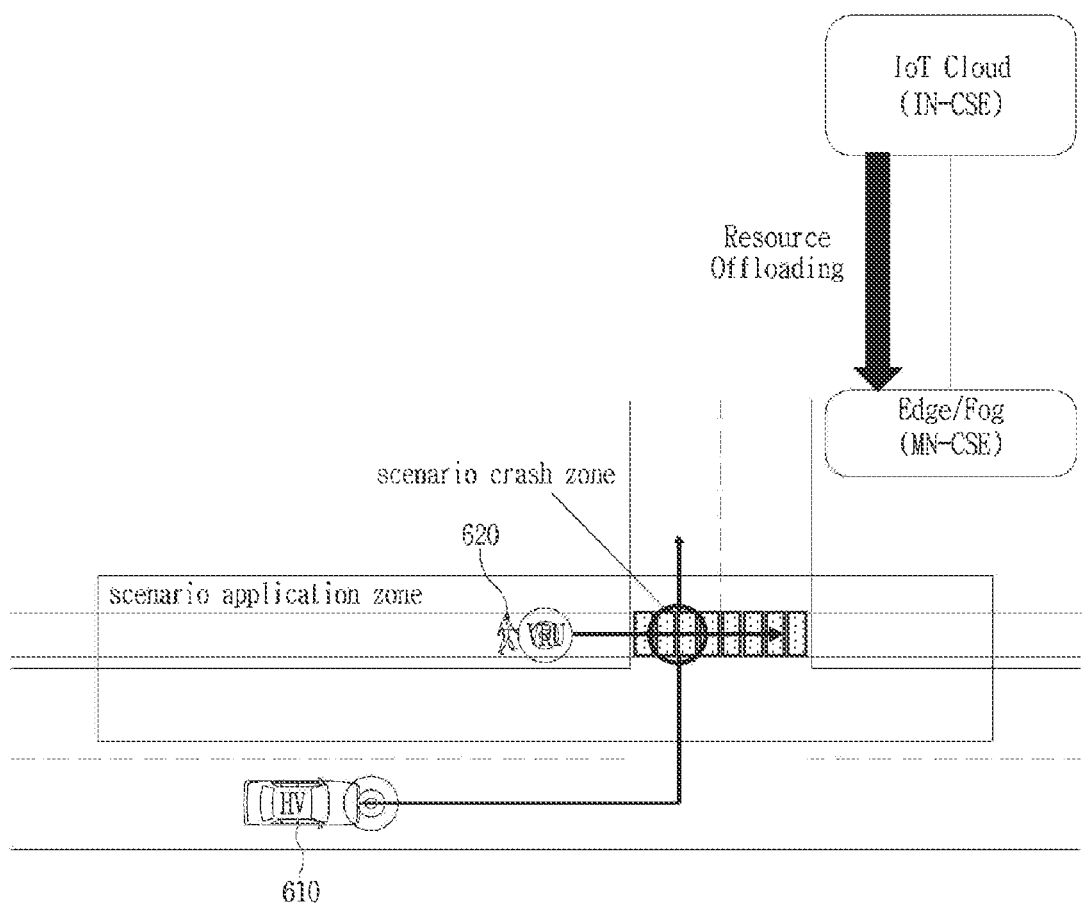
FIG. 6 is a view illustrating a use case requiring resource offloading according to the present invention.

FIG. 6 is a view illustrating a case in which resource offloading is applied. Referring to FIG. 6, a possibility of collision between a vehicle (Host Vehicle: HV) 610 and a user (Vulnerable Road User: VRU) 620 may exist in a predetermined area. In particular, as an example, the predetermined area may be an area covered by an MN node. In addition, as an example, the predetermined area may be set differently, and is not limited to the above-described embodiment. As an example, it is possible to consider a case in which the vehicle 610 enters an area covered by an MN node. As described above, the vehicle 610 and the user 620 may have a collision risk within an area covered by an MN node. Herein, when the vehicle 610 is registered in a server and operates based on a resource registered in the server, a delay in resource processing may occur due to a plurality of CSEs and AEs registered in the server. However, since the collision between the vehicle 610 and the user 620 in a certain area may occur in real time, there may be a high requirement for low latency for preventing collision. Accordingly, when the vehicle 610 operates based on a resource registered in a server, the low-latency requirement described above may not be satisfied.

Accordingly, for example, when a vehicle (or a moving object) enters an area covered by the above-described MN node, an offloading resource procedure may be performed. Thus, the MN node may be configured to obtain a resource for the vehicle, thereby satisfying the low latency requirement. In other words, instead of processing the resource by a server as in a central control method, when processing the resource through an MN node in edge/fog computing, overhead for resource processing may be reduced and the low-latency requirement may be satisfied. Herein, as an example, the vehicle 610 or the user 620 may be configured to transmit offloading triggering to the MN node. Next, the MN node may offload a resource. Herein, the resource offloading may refer to implementing at least one of resource selection and resource retrieval, which will be described later.

In particular, the above-described MN node may be configured to store its own resources and the offloaded resource. For example, the MN node may be a node that has sufficient performance to offload a resource as described above. In other words, the data processing performance of the MN node as edge/fog computing may be sufficient to process an offloaded resource, and is not limited to the above-described embodiment. Herein, as an example, when the resource is offloaded to the MN node, the vehicle 610 or the user 620 may operate based on the resource that is offloaded to the MN node and thus may avoid collision. Meanwhile, as an example, the vehicle 610 or the user 620 may include an application, and offloading may be triggered based on an application, as described above. This will be described later.

For a more specific example, referring to FIG. 6, a cloud IoT (Cloud IoT) server needs to delegate a resource and a task to an edge/fog node. Herein, a VRU detection service may be a service for detecting pedestrians or cyclists in a vehicle domain. Herein, a VRU application may provide accurate location information according to various traffic conditions. Herein, as an example, information regarding the VRU detection service may be shared between VRUs. In addition, VRUs may know location information (or current location information) via a smartphone or other device. In addition, as an example, HVs may also be configured to detect the VRUs through the above-described information, thereby avoiding collision. As an example, referring to FIG. 6, when a driver of HV intends to turn left, a pedestrian or a cyclist may pass a place to which the HV is about to move. In this case, as an example, the HV may be configured to send an alarm or a warning sound based on the above-described VRU detection service.

Herein, as an example, when the HV is registered in the above-described offloading service, while the HV enters an application zone (or the certain area described above) covered by an MN node (or MN-CSE, Edge/Fog), the above-described offloading procedure may be implemented. Thus, a resource and/or a task related to the HV may be offloaded from a server to the MN node. Herein, as an example, the server may provide indication for resource offloading to the MN node. An MN node may be configured to retrieve a relevant resource and/or task from a corresponding resource tree. For example, when an MN node is a node that is closest to a HV, the MN node may be configured to transmit a warning message in response to sensing a VRU.

In addition, as an example, FIG. 6 is only one example, and offloading may be triggered in consideration of another situation or case and is not limited to the above-described embodiment. In other words, resource offloading may be configured to deliver a relevant resource and/or task from a server (or IN-CSE) to a target edge/fog (MN-CSE). Next, an MN node may directly provide an offloading service to a lower terminal, which will be described later.

Figure 7:
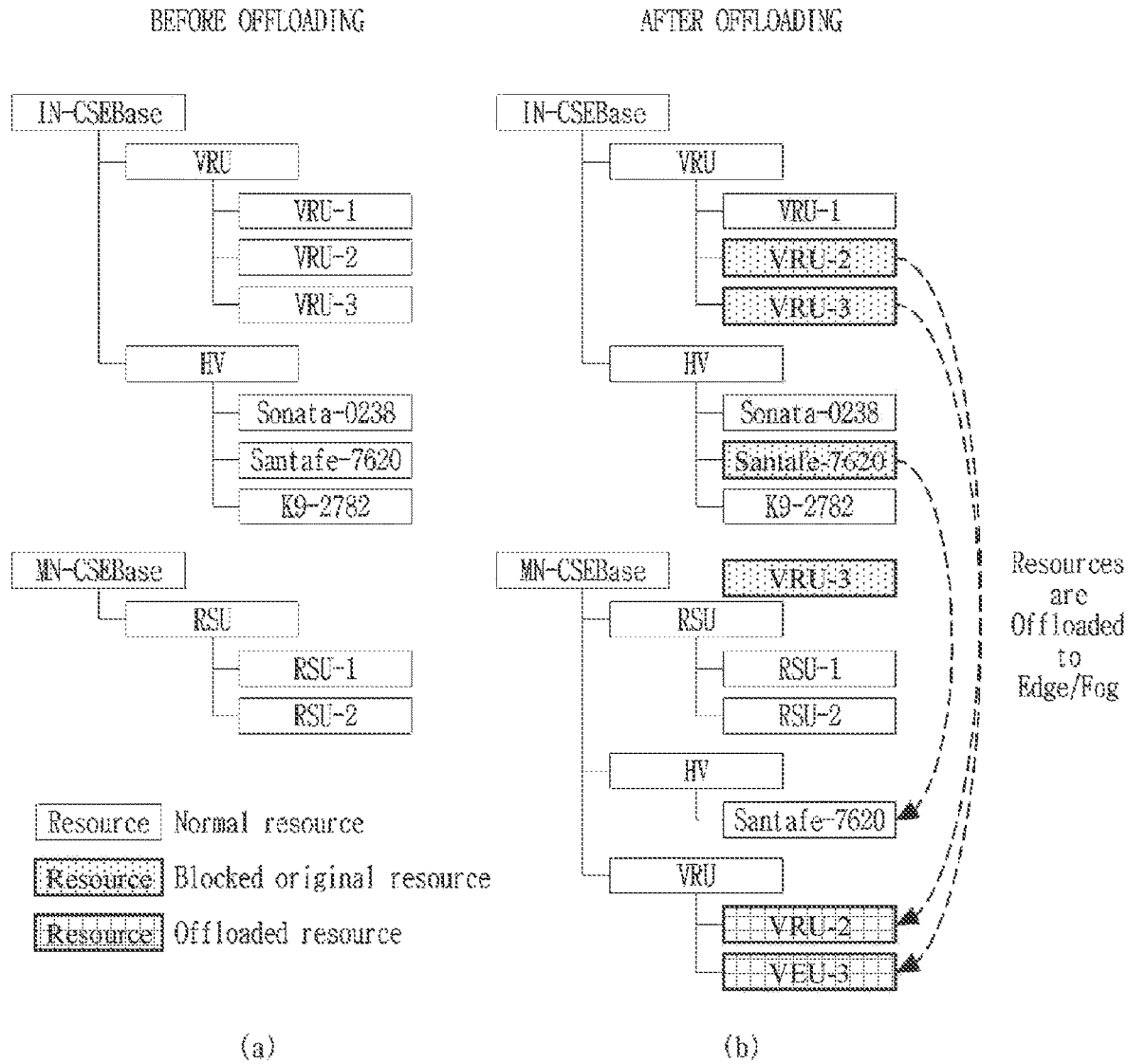
FIG. 7 is a view illustrating a resource offloading method according to the present invention.
Figure 8:
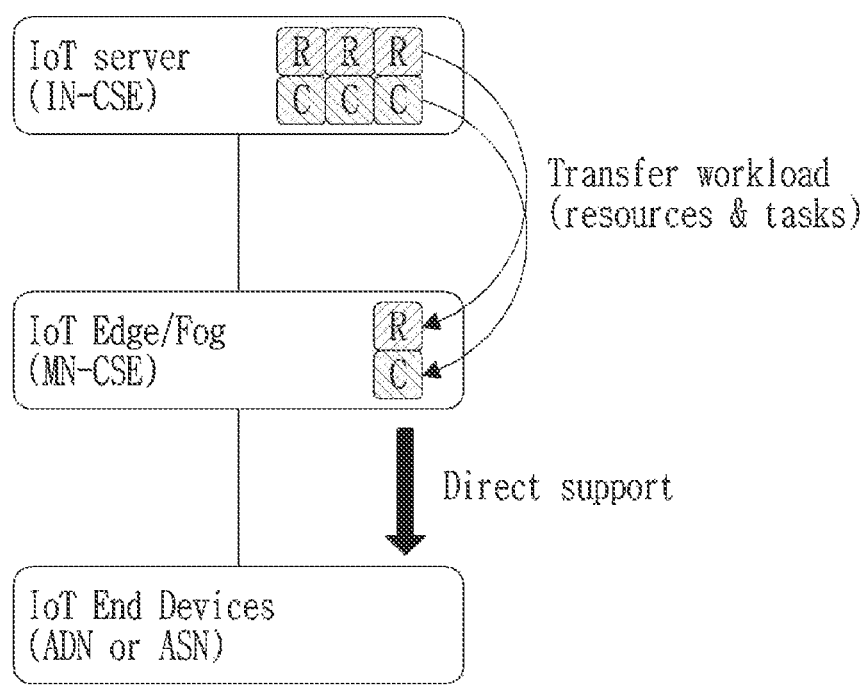
FIG. 8 is a view illustrating a resource offloading method according to the present invention.

FIG. 7 and FIG. 8 are views illustrating a method in which offloading is performed to an MN node. Referring to FIG. 7A, resources may be registered to an IN node and an MN node, respectively, before offloading is performed. For example, the IN node may correspond to a server, and the MN node may correspond to an edge/fog node, but the present disclosure is not limited thereto. Herein, as an example, an application for a user and an application for a vehicle may be registered as resources in the server (or IN node, H-CSE). In particular, information on each application may be included in each application resource and/or task as a sub-resource. In addition, as an example, a separate resource and/or task may also be included in the edge/fog node (or MN node, R-CSE). In other words, a separate resource and/or task may be registered for the corresponding CSE as MN node.

As an example, referring to FIG. 7B, a resource registered in a server may be offloaded to an edge/fog node. Herein, as described above, the resource offloading may be performed for a necessary resource and/or task based on a predetermined area or a predetermined condition. As an example, in FIG. 7B, for information on a user and a vehicle included in a predetermined area as described above, application resources for the user and the vehicle respectively may be offloaded to an MN node. Herein, in the MN node, information on the user and the vehicle included in the above-described area may be included in each application resource. Thus, the operation of each application for each user and each vehicle may be performed based on a resource of MN node, and the low-latency requirement may be satisfied.

In addition, as an example, referring to FIG. 8, a resource and/or a task included in a server (or IoT server, IN-CSE) as described above may be offloaded to implemented. An edge/fog (or IoT Edge/Fog, MN-CSE). Herein, as an example, a lower terminal (or IoT End Device, ADN, ASN) may be supported by operations related to a resource through a service before the resource is offloaded. On the other hand, after the resource is offloaded, the lower terminal may be configured to directly receive the resource-related operations through an edge/fog. In other words, as described above, in consideration of delay and reliability reduction by a centralized method, it is possible to offload related resources to an edge/fog node, and the present disclosure is not limited to the above-described embodiment.

Figure 9:
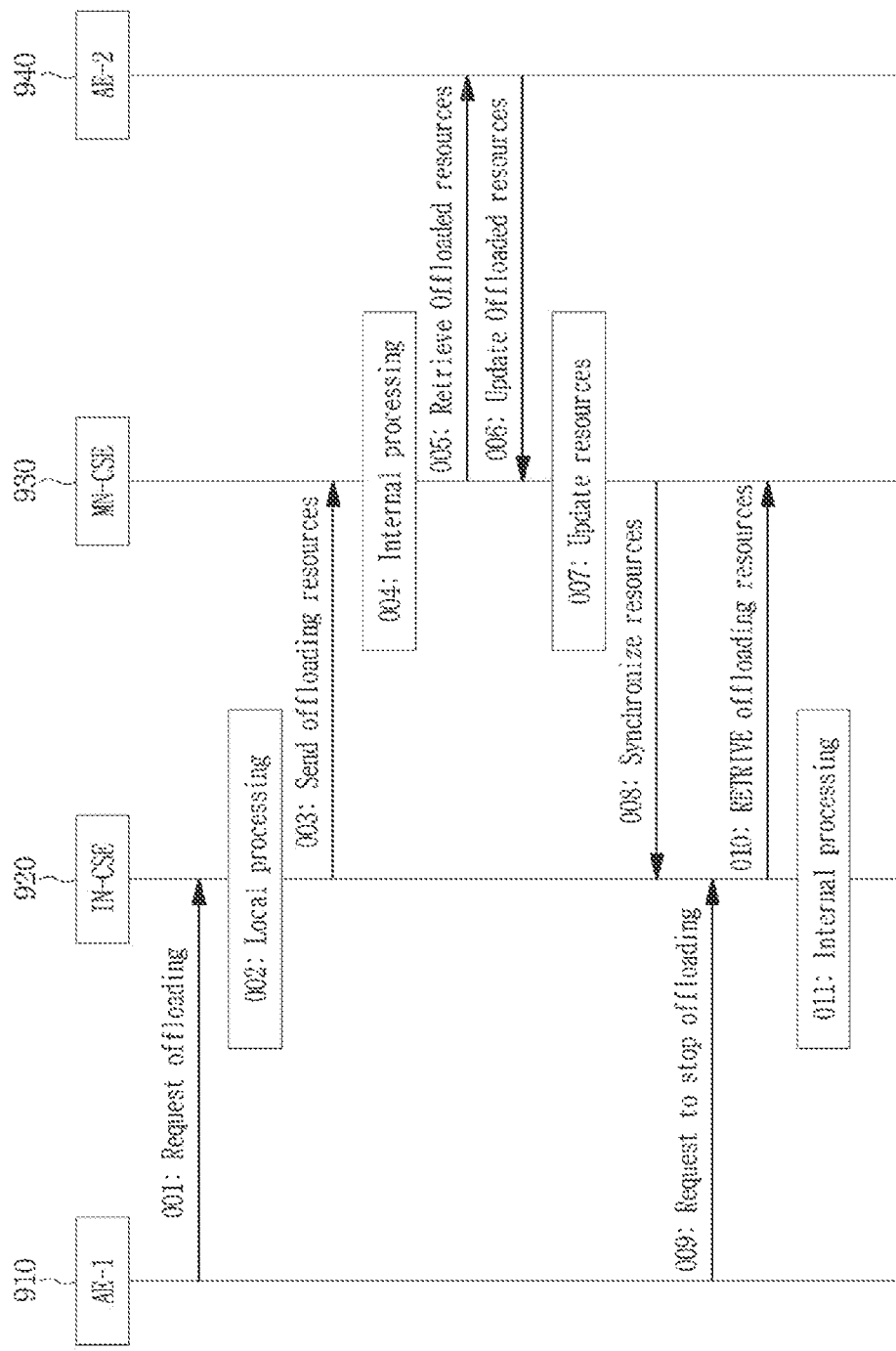
FIG. 9 is a view illustrating a method for performing resource offloading according to the present invention.

FIG. 9 is a view illustrating a method for performing resource offloading according to the present invention. Referring to FIG. 9, an application entity (AE) node may be configured to execute an offloading process to receive a specific service from a closest edge/fog node. As an example, AE-1 910 may be configured to transmit an offloading request message to IN-CSE 920. Herein, as an example, the offloading request message may include at least one of an offloading indication, a target offloading resource, an address of the destination CSE, and status information of an offloaded resource. Herein, as an example, the target offloading resource, as a relevant service or a resource related to the service, may indicate a source resource that needs to be offloaded (or an original resource or a target resource). As an example, the target offloading resource may be provided as a list of target resources.

In other words, information on resources that are to be offloaded may be included in a request message. In addition, the address of the destination CSE may be address information for an IN-CSE or an MN-CSE. As an example, a CSE to which a resource is offloaded may be an MN-CSE 930, as described above. However, as an example, a CSE to which a resource is offloaded may be an IN-CSE. As an example, when an IN-CSE is adjacent to a user (or AE) requesting a corresponding service and overhead is insufficient, a resource may be offloaded to the IN-CSE. In other words, the IN-CSE 920 may also become a target of resource offloading, but is not limited to the above-described embodiment.

In addition, as an example, status information of an offloaded resource may indicate status information after the resource is offloaded. More specifically, while a resource is being offloaded to the target CSE 930, a source resource may be invisible. In other words, an offloaded resource may not be accessible to a source resource. As an example, as described above, when a source resource is inaccessible, status information may be "Block". In addition, as an example, when a resource is offloaded, readable permission for a source resource may be allowed. In other words, even when a corresponding resource is offloaded to another CSE, the IN-CSE 920 may be capable of reading and checking a source resource. Herein, as an example, the above-described status information may be "Readable". In addition, as an example, when a resource is offloaded, readable and writable permission for a source resource may be allowed. In other words, even when a corresponding resource is offloaded to another CSE 930, the IN-CSE 920 may be capable of reading and even changing a source resource. Herein, as an example, the above-described status information may be "Writable". In other words, a request message may include not only information on a target resource to be offloaded but also status information of an offloaded resource and is not limited to the above-described embodiment.

In addition, as an example, when there is no application logic operating for a corresponding service in a target edge/fog node, an algorithm, service logic or an AE for the service may be delivered to the target edge/fog node (AE Transfer, which will be described in further detail below). As an example, the AE 910 may be configured to transmit a request message for offloading for a plurality of resources or group resources.

Next, the IN-CSE 920 may configure an offloaded resource. Herein, each resource that is offloaded may be marked through further information to indicate that it is an offloaded resource. Herein, as an example, marking may be performed based on address information of an edge/fog node. In other words, each resource that is offloaded in the IN-CSE 920 may be marked based on whether it is offloaded and based on information on a node to which it is offloaded, but is not limited to the above-described embodiment.

Next, the IN-CSE 920 may be configured to register an offloaded resource to a destination MN-CSE (edge/fog node) 930. In other words, the IN-CSE 920 may push information on an offloaded resource to the MN-CSE 930. Next, the MN-CSE 930 may be configured to generate the offloaded resource based on a request of the IN-CSE 920. Next, an AE-2 940 may be configured to retrieve information on a corresponding service based on the resource that is offloaded to the MN-CSE 930. As an example, the corresponding service in the above description may be a VRU detection service and provide a VRU detection and warning service.

In addition, the AE-2 940 may be configured to update at least one offloaded resource. In addition, as an example, the AE-2 940 may be configured to update some sets of offloaded resources but is not limited to the above-embodiment. Herein, as an example, in the case of a VRU detection service as described above, the update may be performed when a VRU moves to an application zone (or service zone), but is not limited to the above-described embodiment.

In addition, as an example, the MN-CSE 930 may be configured to receive update information from the AE-2 940. Next, the MN-CSE 930 may also be configured to execute update based on an offloaded resource. In addition, when the MN-CSE 930 executes update, the MN-CSE 930 may be configured to transmit updated information to the IN-CSE 920. Herein, as an example, the IN-CSE 920 and the MN-CSE 930 may be configured to execute synchronization based on the above-described information. Herein, as described above, when the status information of a resource is "Block", the above-described update (or synchronization) may be suspended until every offloaded resource is released from the MN-CSE 930. In other words, as described above, since a source resource is not accessible to the IN-CSE 920, the above-described update may be executed only when all the offloaded resources are released from the MN-CSE 930.

In addition, as an example, when resource processing in an edge/fog node is not needed for a corresponding service, offloading may be suspended. Herein, as an example, the AE-1 910 may be configured to transmit a request message for suspending offloading to the IN-CSE 920. Herein, the request message for suspending offloading may include at least one of information indicating offloading suspension for a target resource and information indicating suspension for a service related to an offloaded resource. In addition, as an example, information on a target resource may include information on the MN-CSE 930. In other words, information on an offloaded resource and a destination CSE of resource offloading may also be included. Herein, when the IN-CSE 920 receives the above-described request, the IN-CSE 920 may be configured to obtain information on an offloaded resource that is stored. Next, the IN-CSE 920 may be configured to retrieve a value of an offloaded resource from the MN-CSE 930 and update it. Next, the MN-CSE 930 may be configured to delete the offloaded resource. In other words, an offloaded resource may be released from the MN-CSE 930 and return to the IN-CSE 920 that is a source resource.

In sum, a method for performing resource offloading according to the present invention generates an offloading request message that instructs a first node (e.g., IN-CSE 920) to generate an offloaded resource for a source resource. In addition, by the offloading request message, the first node offloads the source resource, for which offloading is requested, to a second node (e.g., IM-CSE 930). Herein, the offloading request message may include attribute information designating a synchronization mode between the offloaded resource and the source resource, attribute information on the source resource for which offloading is requested, and attribute information on the second node.

Hereinafter, in the present invention, two methods for defining a resource type necessary to perform the resource offloading will be described in detail. The first method newly defines and utilizes an offloaded resource or an offloading resource as a resource type. On the other hand, the second method defines an offloaded resource by extending an existing announced resource type.

1. Utilize a New Resource Type (New Resource Type— Offloaded Resources)

A new resource type is defined to perform resource offloading according to the present invention. For example, in M2M standard, it is possible to distinguish four resource types as shown in Table 1 below. Herein, even if not mentioned again, it should be noted that the content disclosed in Table 1 is the same as what is disclosed as the detailed description of the present invention. This applies to the other tables that will be described below. In other words, in the present invention, the detailed description will be disclosed using various tables. Even if a content disclosed in a table is not mentioned again, it should be considered to be the same as what is disclosed as the detailed description of the present invention.

TABLE 1

| Resource Types | Description |
|---|---|
| Normal resources | Normal resources include the complete set of representations of data which constitutes the base of the information to be managed |
| Virtual resources | A virtual resource is used to trigger processing and/or retrieve results, but they do not have a permanent representation in a CSE |
| Announced resources | An announced resource contains a set of attributes of the original resource. An announced resource is updated automatically by the Hosting CSE of the original resource whenever the original resource changes. The announced resource contains a link to the original resource |
| Offloaded resources | An offloaded resource contains a set of attributes of the original resource. An offloaded resource is updated directly by oneM2M applications and original resource is updated by the CSE hosting offloaded resource. The offloaded resource contains a link to the original resource |

Accordingly, according to an embodiment of the present invention, as a type of offloaded resources that is distinguished from a type of announced resources is newly defined, it is possible to utilize features peculiar to offloaded resources.

In relation to this, resource offloading according to the present invention offloads and transfers not only an offloaded source resource (or referred to as "original resource" or "target resource") that is managed in a hosting CSE (or a first node) but also relevant service execution to a target CSE (e.g., a second node). However, after offloading, it is necessary to determine how to perform synchronization between the source resource and an offloaded resource and how far the management permission (e.g., Read/Write) of the source resource is to be given. The present invention is directed to provide a specific execution method for performing the resource offloading.

In relation to this, attribute information (attributes) that are commonly applied to the resource types may be defined as in Table 2. However, as an example, it may be included that the attributes of Table 2 are applied to at least two resource types. Accordingly, the attributes of Table 2 may be set to be applicable to all the resource types but "virtual resource" among the resource types.

TABLE 2

| | |
|---|---|
| announceTo | This attribute may be included in a CREATE or UPDATE Request in which case it contains a list of addresses/CSE-IDs where the resource is to be announced. For the case that CSE-IDs are provided, the announced-to CSE shall decide the location of the announced resources based on the rules described in clause 9.6.26. For the original resource, this attribute shall only be present if it has been successfully announced to other CSEs. This attribute maintains the list of the resource addresses to the successfully announced resources. Updates on this attribute will trigger new resource announcement or de-announcement. If announceTo attribute includes resource address(es), the present document does not provide any means for validating these address(s) for announcement purposes. It is the responsibility of the Hosting-CSE referenced by the resource address(s) to validate the access privileges of the originator of the Request that triggers the announcement. |
| announcedAttribute | This attributes shall only be present at the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| offloadTo | This attribute may be included in a CREATE or UPDATE Request in which case it contains the address/CSE-IDs where the resource is to be offloaded. For the case that CSE-IDs are provided, the offloaded-to CSE shall decide the location of the offloaded resources. For the original resource, this attribute shall only be present if it has been successfully offloaded to the target CSE. This attribute maintains the resource address to the successfully offloaded resource. Updates on this attribute will trigger migration of offloaded resource (or handover). |
| offloadSync | Synchronization modes used to indicate how to synchronize data between the original and offloaded resources. This attribute is optional. The value of the offloadSynch attribute is a list of individual values, each of them being: Periodic: updates to the offloaded resource are periodically applied to the original resources Update: when there is any update to the offloaded resource, the changes are applied to the original resource immediately Finish: the original resources are updated only at the time the offloaded resource is deleted from the remote CSE and the Edge/Fog service is terminated. |
| syncTime | If offloadSync attribute is set to 'Periodic', this attribute should be configured to set up timer performing synchronization. |
| syncResponsibility | This attribute setup which entity has responsibility to perform synchronization. The attribute can have either: Original CSE: Original CSE has a responsibility to perform synchronization |

TABLE 2-continued

Remote CSE: Remote Target CSE has a responsibility to perform synchronization

---

Among the common attributes, especially the attributes "offloadTo", "offloadSync", "syncTime" and "syncResponsibility" newly define necessary attributes for performing resource offloading according to the present invention.

Herein, as the "offloadTo" attribute is information that may be used in the "UPDATE" and "CREATE" messages among offloading execution messages, it may include information indicating a node in which resource offloading is performed. For example, the "offloadTo" attribute may include address of a second node receiving offloading or include CSE-ID of the second node. Accordingly, when the "offloadTo" attribute is defined in a source resource, the source resource may be offloaded to a node that is designated by the "offloadTo" attribute. In addition, with reference to the "offloadTo" attribute, a node requesting offloading (e.g., AE-1 910) may request by including the address of the second node in an offloading request message. In addition, when resource offloading is completed, the "offloadTo" attribute may include an address where offloading is completed.

In addition, the "offloadSync" attribute indicates information designating a synchronization method between the offloaded resource and the source resource (or original resource or target resource). For example, the following three types of synchronization methods are distinguished.

Periodic: indicates an attribute that periodically updates an offloaded resource to a source resource. Accordingly, when the "offloadSync" attribute is designated as "Periodic", a second node managing the offloaded resource will report an offloaded resource, which is updated at a preset cycle time (e.g., "syncTime") to be described below, to a first node in which a source resource exists. In addition, the first node receiving the report becomes capable of updating update information to the source resource.

Update: indicates an attribute that updates an update content to a source resource every time the update content occurs in an offloaded resource. Accordingly, when the "offloadSync" attribute is designated as "Update", a second node managing an offloaded resource will report the occurrence of update to a first node, in which a source resource exists, every time an update of the offloaded resource occurs. In addition, the first node receiving the report becomes capable of updating update information to the source resource.

Finish: indicates an attribute that updates a final offloaded resource content to a source resource at a time when an offloaded resource is deleted in a second node or an offloading service of the second node terminates. Accordingly, when the "offloadSync" attribute is designated as "Finish", a second node managing an offloaded resource will report deletion of the offloaded resource or termination of an offloading service to a first node, in which the source resource exists, at a time when the offloaded resource is deleted or the offloading service terminates. In addition, the first node receiving the report becomes capable of updating final update information to the source resource and of designating offloading service termination.

In addition, the "syncTime" attribute information is an attribute that designates synchronization cycle information (timer performing synchronization) for performing the instruction when the "offloadSync" attribute is designated as "Periodic". Accordingly, when the "offloadSync" attribute is designated as "Update" or "Finish", the "syncTime" attribute may not be needed.

In addition, the "syncResponsibility" attribute information is information designating a node that is responsible for executing the synchronization. For example, it is possible to specify that the responsibility to execute the synchronization is taken by a second node (e.g., MN-CSE 930 or a target CSE). In particular, the second node has the responsibility to execute synchronization according to any one of "Periodic", "Update" and "Finish" that specify the synchronization methods. Accordingly, the second node needs to provide update information to a first node according to the designated methods of "Periodic", "Update" and "Finish".

In addition, it is possible to specify that the responsibility to execute synchronization is taken by a first node (e.g., IN-CSE 920 or original CSE). In particular, the first node has the responsibility to execute synchronization according to any one of "Periodic", "Update" and "Finish" that specify the synchronization methods. Accordingly, a first node may request updated contents or information of an offloaded resource to a second node according to the "Periodic", "Update", or "Finish" methods designated above.

As another alternative, while the "syncResponsibility" attribute is not given separately, it is possible to predetermine which of a first node and a second node has the responsibility to execute synchronization. For example, it is possible to define by the M2M standard that a first node always has responsibility of synchronization. Particularly, no separate "syncResponsibility" attribute is needed, and the first node may request an update content or information corresponding to a second node according to any one of the "Periodic", "Update", and "Finish" methods that are designated as synchronization methods.

Table 3 shows some examples of the newly-defined offloaded resource types.

TABLE 3

| Offloaded Resource Type | Short Description | Child Resource Types |
| --- | --- | --- |
| accessControlPolicyOffload | Offloaded variant of accessControlPolicy | subscription |
| AEOffload | Offloaded variant of AE | subscription, container, containerOffload, flexContainer, flexContainerOffload, group, groupOffload, |

TABLE 3-continued

| Offloaded Resource Type | Short Description | Child Resource Types |
|---|---|---|
| containerOffload | Offloaded variant of container | accessControlPolicy, accessControlPolicyOffload semanticDescriptor, semanticDescriptorOffload, timeSeries, timeSeriesOffload container, containerOffload, flexContainer, flexContainerOffload, group, groupOffload, accessControlPolicy, accessControlPolicyOffload semanticDescriptor, semanticDescriptorOffload, timeSeries, timeSeriesOffload |
| contentInstanceOffload | Offloaded variant of contentInstance | semanticDescriptor, semanticDescriptorOffload |
| flexContainerOffload | Offloaded variant of flexContainer | container, containerOffload, flexContainer, flexContainerOffload, subscription, semanticDescriptor, semanticDescriptorOffload, timeSeries, timeSeriesOffload |
| groupOffload | Offloaded variant of group | subscription, semanticDescriptor, semanticDescriptorOffload |
| locationPolicyOffload | Offloaded variant of locationPolicy | None specified |
| mgmtObjOffload | Offloaded variant of mgmtObj | Subscription |
| nodeOffload | Offloaded variant of node | mgmtObjOffload, subscription, semanticDescriptor, semanticDescriptorOffload, scheduleOffload |
| remoteCSEOffload | Offloaded variant of remoteCSE | container, containerOffload, contentInstanceOffload, flexContainer, flexContainerOffload, group, groupOffload, accessControlPolicy, accessControlPolicyOffload, subscription, scheduleOffload, timeSeries, timeSeriesOffload, timeSeriesInstanceOffload, remoteCSEOffload, nodeOffload, mgmtObjOffload, AEAnnc, locationPolicyOffload |
| scheduleOffload | Offloaded variant of schedule | None specified |
| semanticDescriptorOffload | Offloaded variant of semanticDescriptor | Subscription |
| timeSeriesOffload | Offloaded variant of timeSeries | timeSeriesInstance, timeSeriesInstanceOffload, subscription, semanticDescriptor, semanticDescrptorOffload |
| timeSeriesInstanceOffload | Offloaded variant of timeSetriesInstance | None specified |

Herein, as all the offloaded resource types shown in Table 3 contain the suffix "offload", they may be easily distinguished from other resource types.

In addition, according to Table 3, each offloaded resource type may further have a child resource type. Together with each parent offloaded resource type, the child resource type includes information that may distinguish the offloaded resource type more specifically.

Table 4 and Table 5 show examples of commonly used attributes that are commonly applied to all the offloaded resource types disclosed in Table 3.

TABLE 4

| Attributes Name | Mandatory/ Optional | Description |
|---|---|---|
| resourceType | Mandatory | Resource Type. a suffix of "Offload" to the name of the original resource type shall be used to indicate the name for the associated offloaded resource type. |
| resourceID | Mandatory | Identifies the resource at the remote CSE |
| resourceName | Mandatory | See clause 9.6.1.3 for information on this attribute |
| parentID | Mandatory | Identifies the parent resource at the remote CSE. |
| creationTime | Mandatory | See clause 9.6.1.3 for information on this attribute. |
| lastModifiedTime | Mandatory | See clause 9.6.1.3 for information on this attribute. |
| expirationTime | Mandatory | See clause 9.6.1.3.2 for information on this attribute. This attribute cannot exceed the value received from the original resource but it can be overridden by the policies of the remote CSE hosting the offloaded resource. |
| link | Mandatory | Provides the URI to the original resource. |

TABLE 5

| Attribute Name | Mandatory/ Optional | Description |
|---|---|---|
| accessControlPolicyIDs | Conditionally Mandatory | The list of identifiers (either an ID or a URI) of an <accessControlPolicy> resource offloaded by the original resource See clause 9.6.1.3.2 for further information on this attribute. If this attribute was not present in the original resource, the original resource shall include this attribute by providing the accessControlPolicyIDs from the original resource's parent resource or from the local policy according at the original resource. |
| stateTag | Conditionally Mandatory | An incremental counter of modification on the resource. See clause 9.6.1.3.2 for information on this attribute. |
| labels | Conditionally Mandatory | Tokens used as keys for discovering resources as offloaded by the original resource. See clause 9.6.1.3 for further information on this attribute. The attribute is conditionally mandatory, which means that the attribute shall exist in the offloaded resource if it is present in the original resource. |

Hereinafter, with reference to Table 2 to Table 5, a method for performing resource offloading according to the present invention will be described in detail.

Figure 10:
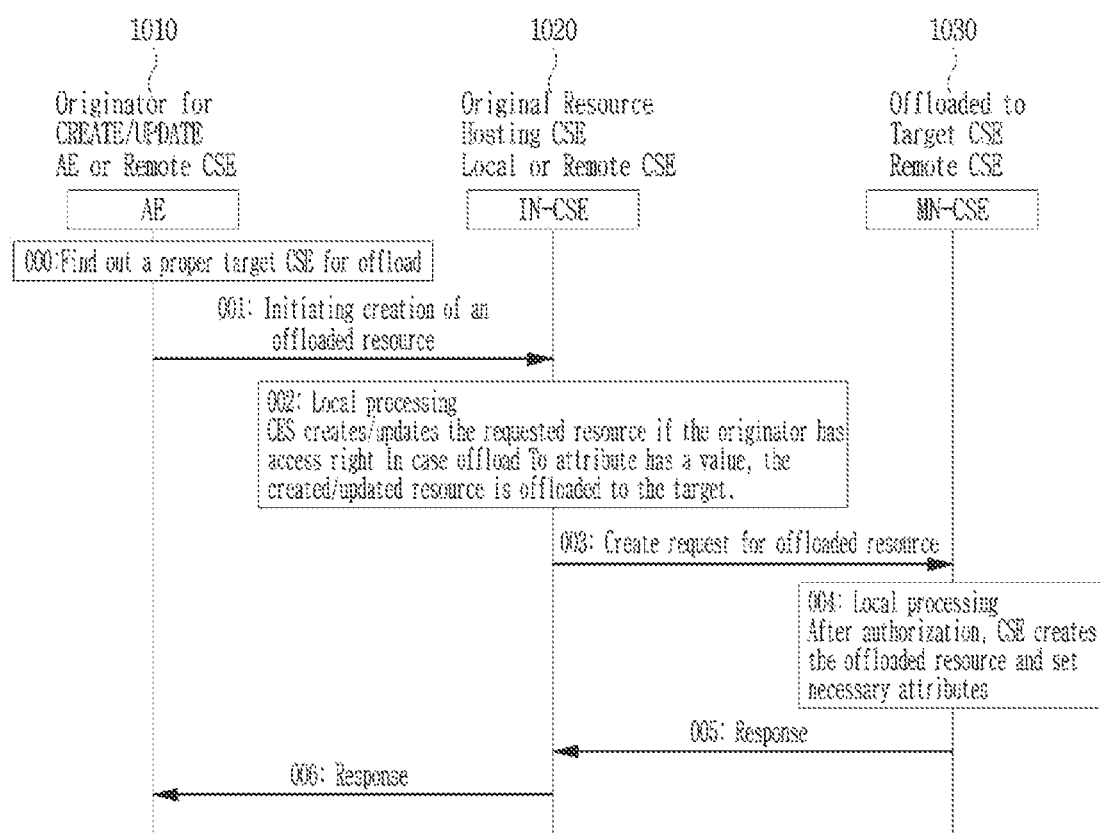
FIG. 10 illustrates an example of a process of creating or updating an offloaded resource among methods for performing resource offloading according to the present invention.

FIG. 10 illustrates an example of a process of creating or updating an offloaded resource among methods for performing resource offloading according to the present invention. For example, an AE or remote CSE 1010 may become an originator requesting generation or update of an offloaded resource. In addition, for example, an IN-CSE 1020 may become a hosting CSE including a source resource, and either a local CSE or a remote CSE is possible. In addition, for example, an MN-CSE 1030 may become a target CSE to which the source resource is offloaded, and it may be a remote CSE.

The AE 1010 may be configured to identify the target CSE 1030 for offloading. The target CSE 1030 may be automatically identified by the above-described VRU service of FIG. 6 or may be identified as the AE 1010 searches for or requests an appropriate target CSE 1030. In addition, when the target CSE 1030 for offloading is identified, the AE 1010 may be configured to request the hosting CSE 1020 to generate an offloaded resource. Herein, for the offload creation, an offloaded resource creation request frame or message (Hereinafter, referred to as "CREATE Request") may be used. Herein, the CREATE Request (e.g., GENERATE Request) may include information on the specific target CSE 1030 in the above-described offloadTo attribute of an offloaded resource. Accordingly, it is possible for the AE 1010 to designate the target CSE 1030.

In addition, the hosting CSE 1020 receiving the CREATE Request verifies whether the AE 1010 is a reliable node and, when the AE 1010 is a reliable node, generates an offloaded resource in response to the CREATE Request. Herein, the hosting CSE 1020 may define the attributes of the offloaded resource by referring to the CREATE Request. For example, it is possible to determine one of the offloaded resource types disclosed in Table 3 and to set attributes disclosed in Table 2, Table 4 and Table 5. Alternatively, the hosting CSE 1020 may define only some offloaded resource attributes and push them to the target CSE 1030. For example, the hosting CSE 1020 may set the "offloadTo", "offloadSync", "syncTime" and "syncResponsibility" attributes as commonly used attributes applied to all the resource types disclosed in Table 2. Next, it requests the target CSE 1030 designated by the CREATE Request to perform offloading.

In addition, receiving a request to generate an offloaded resource from the hosting CSE 1020, the target CSE 1030 verifies whether the hosting CSE 1020 is a reliable node. When the hosting CSE 1020 is a reliable node, in response to the request to generate the offloaded resource, the offloaded resource is generated within the target CSE 1030. Herein, the target CSE 1030 may be configured to reset attributes of the offloaded resource by referring to the request of the hosting CSE 1020. For example, it is possible to determine one of the offloaded resource types disclosed in Table 3 and to reset commonly used attributes disclosed in Table 2, Table 4 and Table 5. As another alternative, commonly used attributes applied to the offloaded resource types disclosed in Table 2 and Table 3 and every resource type may be set in the hosting CSE 1020, and only attributes commonly applied to the offloaded resource types disclosed in Table 4 and Table 5 may be set in the target CSE 1030 instead.

When resource offloading is completed, the target CSE 1030 transmits a completion response to the hosting CSE 1020. In addition, the hosting CSE 1020 transmits a completion response to the AE 1010. In addition, the AE 1010 may be configured to request an update of an offloaded resource by using an offloaded resource update request frame or message (Hereinafter, referred to as "UPDATE Request"). A process by the UPDATE Request may be performed in the same way as the CREATE Request.

Table 6 below shows an example of specific operation for performing resource offloading by the CREATE Request and/or the UPDATE Request.

TABLE 6

| | Initiate Resource Offloading: CREATE or UPDATE |
|---|---|
| Associated Reference Points | Mca and Mcc. |
| Information in Request message | All parameters defined in table 8.1.2-3 are applicable as indicated in that table. In addition, for the case of the CREATE procedure for a specific resource is described in clause 10.2. The Originator suggests the address(es) or the CSE-ID(s) to which the resource will be offloaded in the Content parameter. |
| Processing at the Originator before sending Request | Content: contains address where the resource needs to be offloaded (within offloadTo attribute): The Originator provides either the address(es) for the offloaded resource or the CSE-ID of the remote CSE where the original resource needs to be offloaded by including such information within the offloadTo attribute of the UPDATE or CREATE Request. |
| Processing at the Receiver | Once the Originator has been successfully authorized, the Receiver (which shall be the original resource Hosting CSE) shall grant the Request after successful validation of the Request: If the Request provides address(es) for the offloaded resource that are not already stored in the offloadTo attribute or for newly created offloadTo attribute, the Receiver shall offload the resource to the offload target CSE. If the Request provides address(es) for the offloaded resource that are not already stored in the offloadTo attribute or for newly created offloadTo attribute, the Receiver shall offload the resource to the offload target CSE. If the Request provides a CSE-ID of the remote CSE that are not already stored in the offloadTo attribute of for the newly created or updated offloadTo attribute, the Receiver shall decide the location at the remote CSE identified by CSE-ID and offload the resource to the offloading target CSE The original resource Hosting CSE shall first check if it is a Registree or the Registrar of the offloading target CSE. If that is the case, the offloaded resource shall be created as a direct child of the Hosting CSE's <remoteCSE> resource hosted by the offloading target CSE. If that is not the case, the Hosting CSE shall next check if its <remoteCSE> resource has been offloaded to the offloading target CSE. The Hosting CSE shall perform this check by checking the offloadTo attribute of its <remoteCSE> resource hosted on its Registrar CSE if the offloading target CSE is not a descendent CSE. or the corresponding Registree CSE if the offloading target CSE is a descendent CSE. If it is not offloaded, the Hosting CSE shall request that its Registrar CSE (If the target CSE is not its descendant CSE) or Registree CSE (if the target CSE is its descendant CSE) to create a <remoteCSEOffload> resource representing the Hosting CSE as a direct child of the <CSEBase> of the offloading target CSE. The offloaded resource shall then be created by the Hosting CSE as a direct child resource of the <remoteCSEOffload> resource. |
| Information in Response message | On successful completion of resource offloading as in clause 10.2.3.5, the Receiver shall provide all parameters defined in table 8.1.3-1 that are applicable as indicated in that table in the Response message: The Receiver shall provide the address(es) of the offloaded resource to the Originator by updating the content of the offloadTo attribute in the original resource and by providing it in the UPDATE or CREATE Response message depending on the type of the Request. |
| Processing at Originator after receiving Response | According to clause 10.1.2 in case of CREATE Request. According to clause 10.1.4 in case of UPDATE Request. |
| Exceptions | All exceptions described in the basic procedures (clause 10.1.2) are applicable. |

Figure 11:
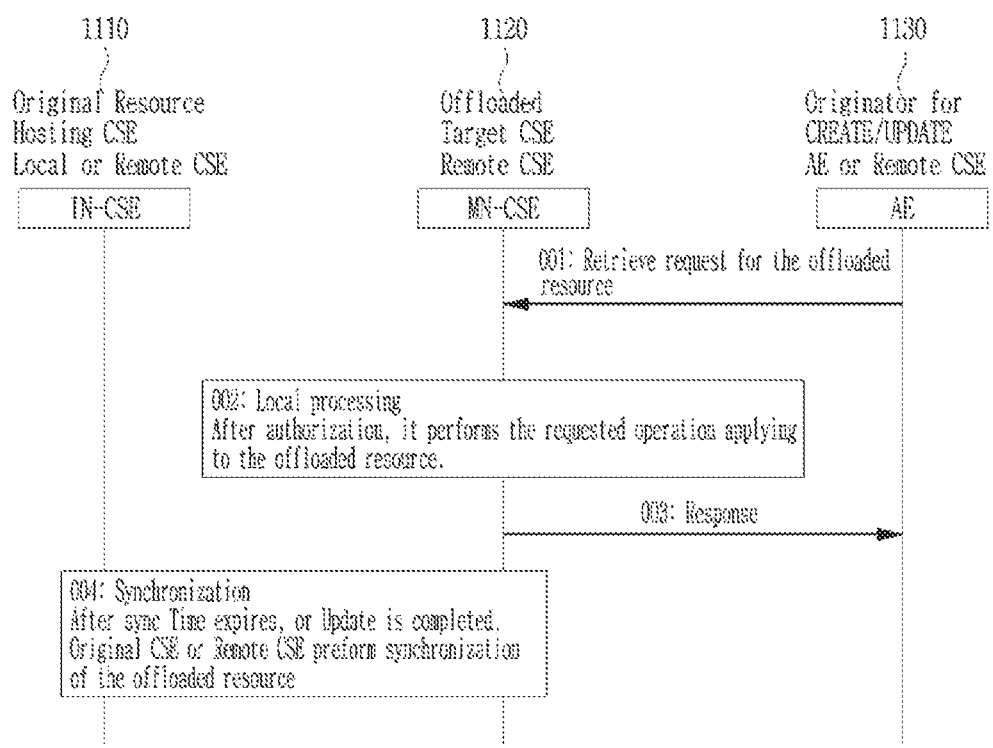
FIG. 11 illustrates an example of a process of retrieving an offloaded resource among methods for performing resource offloading according to the present invention.

FIG. 11 illustrates an example of a process of retrieving an offloaded resource among methods for performing resource offloading according to the present invention. For example, an AE or remote CSE 1130 may become an originator requesting acquisition of an offloaded resource. In addition, for example, an MN-CSE 1120 may become a target CSE managing the offloaded resource and may become a remote CSE. In addition, for example, an IN-CSE 1110 may become a hosting CSE that has a source resource of an offloaded resource and may be either a local CSE or a remote CSE.

The AE 1130 may request acquisition of an offloaded resource. Herein, for the acquisition of the offloaded resource, offloaded resource retrieve request frame or message (Hereinafter, referred to as "RETRIEVE Request") may be used. The target CSE 1120 receiving the RETRIEVE Request verifies whether the AE 1130 is a reliable node. When the AE 1130 is a reliable node, in response to the RETRIEVE Request, the operation requested for the offloaded resource is performed, and a response result is transmitted to the AE 1130.

Herein, after the response result is transmitted, synchronization of offloaded resource may be executed between the target CSE 1120 and the hosting CSE 1110. Herein, the synchronization method may be performed by referring to offloadSync, syncTime and syncResponsibility among the above-described offloaded attributes of Table 2.

Table 7 below shows an example of specific operation for performing resource offloading by the CREATE Request and/or the UPDATE Request.

2. Define an Offloaded Resource by Extending an Announced Resource Type (Enhanced Announcement or Resource Relocation)

To perform resource offloading according to the present invention, an announced resource predefined in the M2M standard may be utilized. This may be referred to as "Enhanced Announcement" or "Resource Relocation". In other words, it is possible to specify a new definition by interpreting an offloaded resource as one type of extended announced resources.

In relation to this, a resource of a local CSE may be relocated to another CSE to support discover and to increase resource utilization. Herein, exemplary scenarios requiring resource relocation may be (1) Offloading (vertical copy), (2) Local Breakout (horizontal copy), (3) Transfer/Shift, (4) Backup, and (5) Handover. Herein, resource relocation is performed in each of the various scenarios, and it is necessary to specify how to manage an original resource and a relocated resource (which includes 'offloaded resource'). For example, it is necessary to newly specify a synchronization problem, access control authority, etc.

Meanwhile, the M2M standard provides an announcement function remotely notifying the existence of a local resource. However, an existing announcement function is directed to support a discovery function and thus has limitations in enhancing availability through resource relocation. Accordingly, as a method for covering a new scenario is required, the present invention intends to propose a method of achieving a resource relocation function including resource offloading by improving the existing announcement function.

TABLE 7

| Resource Retrieval: RETRIEVE | |
|---|---|
| Associated Reference Points | Mca and Mcc. |
| Information in Request message | Clause 8.1.2 specifies the information to be included in the Request message. Table 8.1.2-3 also describes the parameters that are applicable in the Request message:<br>Specifically, the To parameter is set to the address of the offloaded resource to be retrieved.<br>Specifically, the To parameter is set to the address of the offloaded resource to be retrieved.<br>If a specific attribute is to be retrieved, the address of such attribute is included in the To parameter.<br>The Originator can specify one of the values for the optional Result Content parameter.<br>The Originator can request retrieval of the original resource by targeting the offloaded resource at the Hosting CSE by setting the Result Content parameter to the "original-resource". |
| Processing at the Originator before sending Request | The Originator can request retrieval of information from an offloaded resource at the Hosting CSE. |
| Processing at the Receiver | Once the Originator has been successfully authorized, the Receiver (Hosting CSE) shall grant the Request after successful validation of the Request:<br>Information from the identified offloaded resource (at Hosting CSE) shall be returned to Originator via RETRIEVE Response, as described in clause 8.1.2.<br>Information from the identified offloaded resource (at Hosting CSE) shall be returned to Originator via RETRIEVE Response, as described in clause 8.1.2.<br>If Result Content request message parameter set to "original-resource" is included in the Request message, the Receiver shall provide the representation of the original resource indicated by the link attribute in the offloaded resource. The Receiver shall retrieve the original resource to return the representation of the original resource to the Originator. |
| Information in Response message | Information from the identified offloaded resource (at Hosting CSE), or the original resource shall be returned to Originator via RETRIEVE Response, as described in clause 8.1.3. |
| Exceptions | All exceptions described in the basic procedure (clause 10.1.3) are applicable. |

Table 8 defines a new announced resource type. In particular, Table 8 discloses possible examples of update/synchronization responsibility for an original resource according to an announce type, whether redirection is supported, and response authority for RETRIEVE request of another CSE.

announced resource may have attributes limited from an original resource, or an entire set of unlimited attributes, or child resources.

Meanwhile, when an original resource is deleted, all the announced resources of the original resource except <AEAnnc>, which is created during a registration process of

TABLE 8

| Announce Type | Update and synchronization responsibility for original resource | Request Redirect support | Response permission for RETRIEVE request |
|---|---|---|---|
| Announcement | Original Resource Hosting CSE(OHC) | Yes ATC → OHC redirect | Both |
| Vertical/ Horizontal Copy | Announcement Target CSE (ATC) | Yes OHC → ATC redirect | Both * if Result Content is original resource, |
| Transfer | Announcement Target CSE (ATC) | Yes OHC → ATC redirect | Both if Transfer, ATC only |
| Backup | Original Resource Hosing CSE(OHC) | Yes ATC → OHC redirect | OHC only |
| Handover | Announcement Target CSE(ATC) | Yes OHC → ATC→ ATC로 redirect | Both |

According to the disclosure in Table 8, the above-mentioned resource offloading in the narrow sense may correspond only to "vertical copy" among the announced resource types (Announce Types), but the resource offloading in the broad sense may be defined to correspond to all the announced resource types (Announce Types) but the original announcement type. Each of the announced resource types (Announce Type) will be described in detail below.

In relation to this, to inform a remote CSE of the existence of an original resource and/or to relocate an original resource in the remote CSE, or to support AE transfer, an original resource may be announced to one or more remote CSEs. Herein, resource relocation includes copying, moving, backing up and handing over an original resource. An AE having AE-ID-Stem starting with a specific letter (e.g., S), may be deleted. Meanwhile, in the case of announcement for resource back-up, even when an original resource is deleted, it is desirable that an announced resource should not be deleted. When an announced resource is not immediately deleted (for example, in case it is not possible to reach an announced resource), the announced resource will be deleted by an original resource hosting CSE or by its own expiration. Herein, an original resource may store a link list of resources that are announced for the purpose.

Table 9 defines attributes that are commonly applied to all the announced resource types.

TABLE 9

| Attribute Name | Description |
|---|---|
| announceTo | This attribute may be included in a CREATE or UPDATE Request in which case it contains a list of addresses/CSE-IDs where the resource is to be announced. For the case that CSE-IDs are provided, the announced-to CSE shall decide the location of the announced resources based on the rules described in clause 9.6.26.<br>For the original resource, this attribute shall only be present if it has been successfully announced to other CSEs. This attribute maintains the list of the resource addresses to the successfully announced resources. Updates on this attribute will trigger new resource announcement or de-announcement.<br>If announceTo attribute includes resource address(es), the present document does not provide any means for validating these address(s) for announcement purposes. It is the responsibility of the Hosting-CSE referenced by the resource address(es) to validate the access privileges of the originator of the Request that triggers the announcement. |
| announcedAttribute | This attributes shall only be present at the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| announceType | 1. announcement<br>2. Copy (vertical copy, horizontal copy)<br>3. Transfer (AE transfer may be included)<br>4. Backup<br>5. Handover |

TABLE 9-continued

| Attribute Name | Description |
| --- | --- |
| synchMode | 1. Periodic: Sync is performed periodically<br>2. Update: Sync is performed whenever an update to announcedResource is performed<br>3. Finish: Sync is performed when an announcement is finished |
| postanncAccessMode | 1. Block<br>2. Readable<br>3. Writable |

According to Table 9, "announceType", "syncMode" and "postanncAccessMode" may be defined as new attributes.

Herein, the "announceType" attribute may be used as information designating any one of the announced resource types disclosed in the above-described Table 8. In this regard, for example, defining each announced type by distinguishing them was illustrated. However, it is also possible to integrate two or more types into one type by considering bits allocated to "announceType" attribute. For example, it is possible to identify a copy type and a handover type by defining them as one Instant type.

In addition, the "synchMode" attribute may be used as information designating a synchronization mode between an original resource and a relocated resource. For example, the "syncMode" attribute may be designated as any one of "Periodic", "Update" and "Finish". In addition, "postanncAccessMode" is information designating an access mode for an original resource after announcement. For example, the "postanncAccessMode" attribute may be designated as any one of "Block", "Read" and "Write".

Specifically, an original resource hosting CSE may be responsible for synchronization between an attribute announced by an original resource and an announced resource. However, according to a scenario requiring resource relocation, an announcement Target CSE may have synchronization responsibility. For example, in the case of vertical copy (offloading) and horizontal copy (local breakout), since it is desirable that access to an original resource should be blocked and a service should be provided based on an announced resource, synchronization responsibility may be given to an announcement Target CSE.

Meanwhile, synchronization may be performed in various modes. For example, synchronization may be performed periodically (Periodic synchMode), or whenever update is performed for an announced resource (Update synchMode), or at a time announcement finishes (Finish SynchMode). Herein, in the case of Finish SynchMode, an announcement Target CSE executes synchronization for an original resource based on an announced resource and deletes the announced resource. Meanwhile, when synchronization is executed by Finish Synchmode, an original resource changes from a block mode to an active mode.

Figure 26:
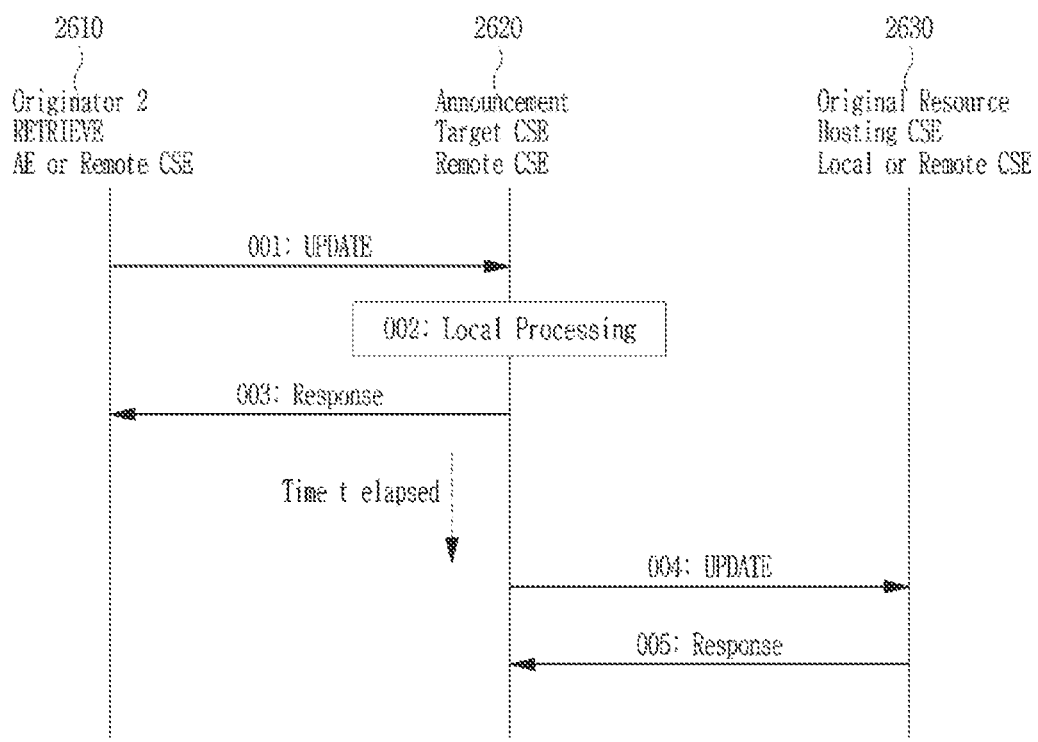
FIG. 26 to FIG. 28 illustrate an example of a process according to a synchronization mode among methods for performing resource relocation according to the present invention.
Figure 27:
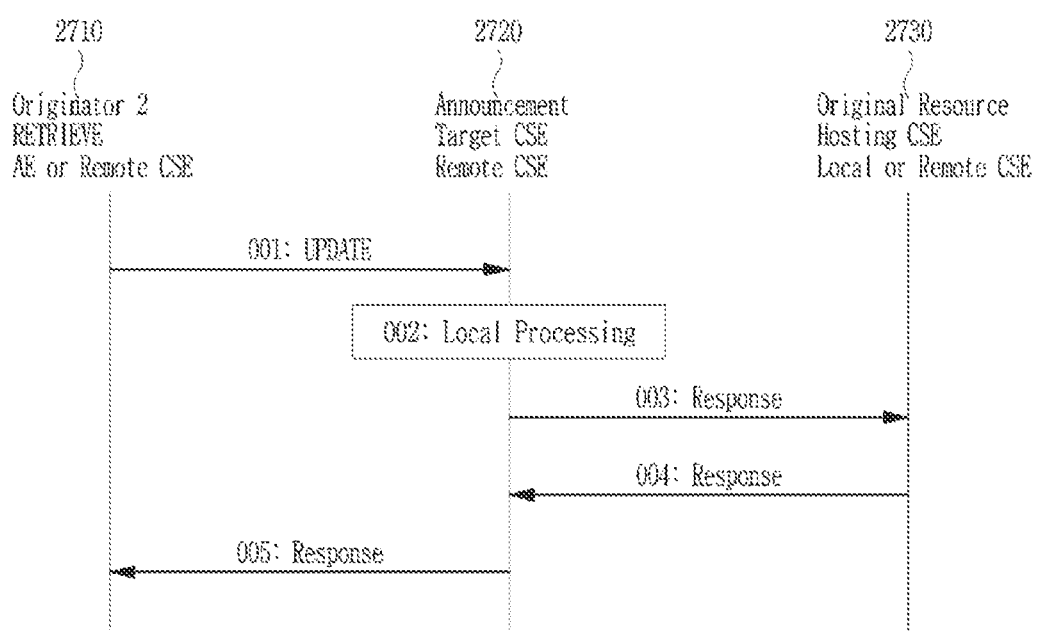
Figure 28:
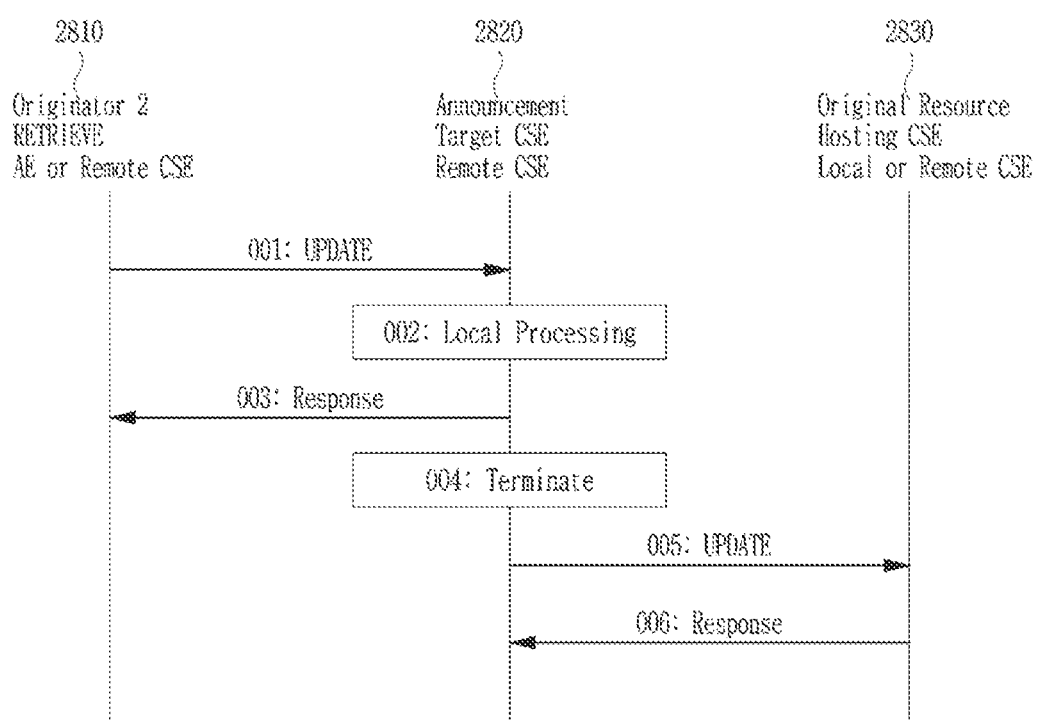

For example, FIG. 26 to FIG. 28 illustrate exemplary processes according to the synchronization modes. FIG. 26 illustrates a synchronization process according to the Periodic synchMode setting. In other words, even when an update request of a resource update originator 2610 is registered, resource update is not immediately executed, but a target CSE 2620 requests resource UPDATE to a hosting CSE 2630 at a preset cycle time (syncTime, T). In response to the request, the hosting CSE 2630 performs synchronization between an announced resource and an original resource.

In addition, FIG. 27 illustrates a synchronization process according to the Update synchMode setting. In other words, whenever an update request of a resource update originator 2710 is registered, a target CSE 2720 requests a resource UPDATE to a hosting CSE 2730. In response to the request, the hosting CSE 2730 immediately performs synchronization between an announced resource and an original resource.

In addition, FIG. 28 illustrates a synchronization process according to the Finish synchMode setting. In other words, even when an update request of a resource update originator 2810 is registered, update is not immediately executed, after the resource relocation service completely finishes, a target CSE 2820 requests resource UPDATE to a hosting CSE 2830. In response to the request, the hosting CSE 2830 performs synchronization between an announced resource and an original resource.

In addition, when announceType is announcement, there will be no synchronization between a child created in an original resource and an announced resource. However, according to a scenario requiring resource relocation, for example, in the case of resource copy, synchronization between a child created in an original resource and an announced resource may be specified.

Meanwhile, after announcement, a status for an original resource may be changed (postAnncmode). For example, even when there is an access request from an entity having access control authority for an original resource, the access request may be processed differently according to the status of an original resource. For example, the original resource may have a "Block" status in which access to the original resource is blocked while a resource is being announced, a "Readable" status in which the original resource may be retrieved even when a resource is announced, or a "Writable" status in which the original resource may be changed even when a resource is announced. The status of an original resource may be changed according to an announcement type. Meanwhile, when there is an access request for an original resource after announcement, it is possible to specify whether to allow redirection to an announced resource.

In addition, when a resource is announced, an original resource should have at least an announceTo attribute. When an optional announced (OA) attribute is announced, an announcedAttribute attribute should also be expressed. In addition, an AE or another CSE may be configured to request an original hosting CSE to announce an original resource to an address or CSE-IDs listed in an announceTo attribute of an announcing request. An update of an announceTo attribute may trigger announcement of a new resource or de-announcement of an announced resource. After a successful announcement process, an announceTo attribute may include only an address list of announced resources.

Herein, the attributes of an announced resource type may be classified into a mandatory announced (MA) attribute, an optional announced (OA) attribute, and a not announced (NA) attribute. The MA attribute refers to an attribute that should be announced together when an announced resource is generated. The OA attribute refers to an attribute that may be optionally announced when an announced resource is generated. On the other hand, the NA attribute refers to an attribute that is not announced when an announced resource is generated.

For example, to announce an attribute marked with OA, the attribute should be included in an announcedAttribute attribute of an original resource. Attributes included in an announcedAttribute attribute are announced to an announced resource. In the case of successful announcement for a resource, these attributes should be generated in an announced resource. Otherwise, they should not be present in an announced resource. An update of an announcedAttribute attribute of an original resource may trigger announcement of a new resource or de-announcement of an announced resource. Announced attributes should have a same value as an original resource, and an original hosting CSE is responsible for synchronization between a value of an announced attribute of an original resource and a value of an announced resource.

In addition, an announced resource may have child resources. Generally, a child resource of an announced resource should be one of resource types, which are specified as possible child resource types of an original resource, or announced resource types related thereto. However, in the case of a specific announced resource type, an exception may be applied concerning which child resource type may be generated.

Meanwhile, child resources of an original resource may be independently announced, if necessary. In particular, child resources of an announced resource should be an announced type related to child resource. When a child resource of an announced resource is locally generated in a remote CSE, the child resource should be a usual child resource type. That is, it may refer to a resource type that is not announced.

For example, when a hosting CSE of an original resource starts announcement, it should be checked at first whether a parent resource of the original resource is already announced to an announcement target CSE. In particular, an announced resource should be generated as a child resource of the parent resource that is already announced. Otherwise, it should be checked whether the hosting CSE is registered in the announcement target CSE. Particularly, an announced resource should express the hosting CSE of the original resource and should be generated as a child of <remoteCSE> that is hosted by the announcement target CSE. Otherwise, the hosting CSE should create <remoteCSEannc> as a child of <CSEBase> expressing the announcement target CSE and announce it to the announcement target CSE. In other words, an announced resource should be generated as a child resource of <remoteCSEAnnc>.

In addition, when a hosting CSE of an original resource starts announcement, a parameter of an announcement request should include one of Absolute-CSE IDs of the hosting CSE of the original resource, when an announcement target CSE is in a same SP domain and SP-relative-CSE-ID of the hosting CSE of the original resource or the announcement target CSE is in another SP domain.

Figure 12:
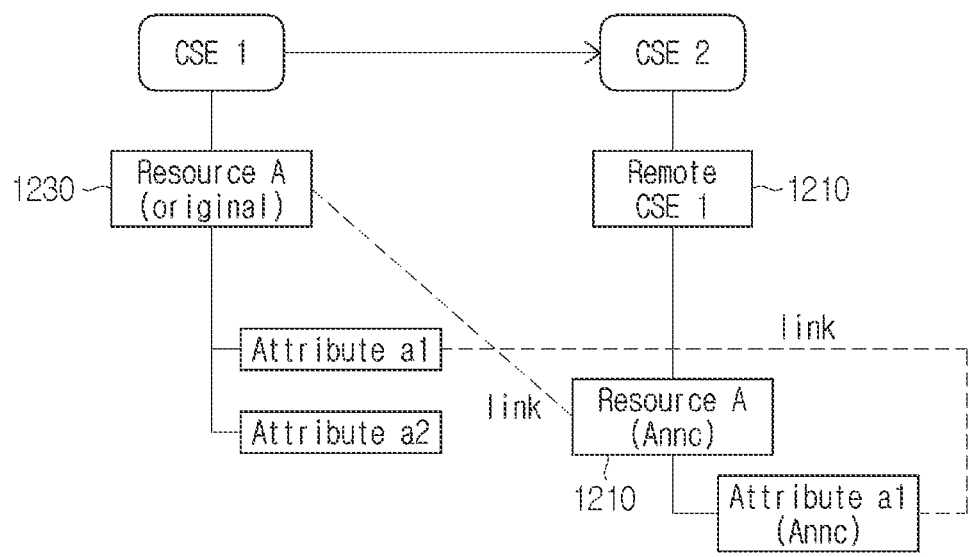
FIG. 12 illustrates an announcement type among announced resource types according to the present invention.

FIG. 12 illustrates an announcement type among announced resource types according to the present invention. Original Resource A 1230 may be announced from CSE 1 to one or more CSE 2 to announce its presence. Herein, the Resource A is located under a remote CSE 1 1210 of CSE 2, and the announced Resource A is marked as Resource A(Annc) 1220.

In other words, a necessary attribute for the purpose of discovery (e.g., attribute a1) may be announced. Particularly, it may include link information on an original resource and an original attribute. Herein, it may be defined that CSE 1 has synchronization authority for Resource A.

Figure 13:
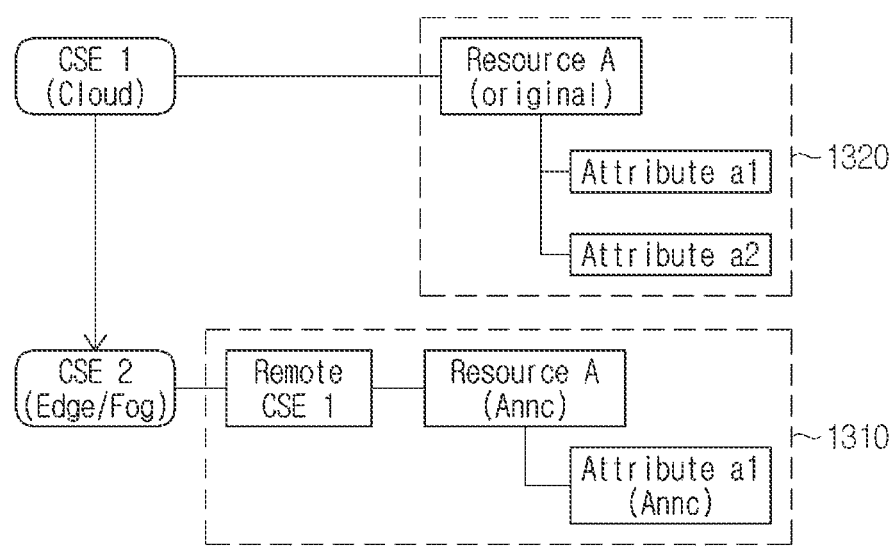
FIG. 13 illustrates a vertical resource copy type among announced resource types according to the present invention.

FIG. 13 illustrates a vertical resource copy type among announced resource types according to the present invention. For example, in the case of vertical resource copy, resource and service 1320 performed in CSE 1 (e.g., Cloud) may be provided in a lower CSE 2 (e.g., Edge/Fog) based on copied resource 1310. Thus, the service may be provided more rapidly. Herein, unlike the existing announcement function, since a service is provided based on an announced resource, the access control authority for the original resource 1320 is limited. For example, as the access control authority, the access to the original resource 1320 itself may be blocked.

Figure 14:
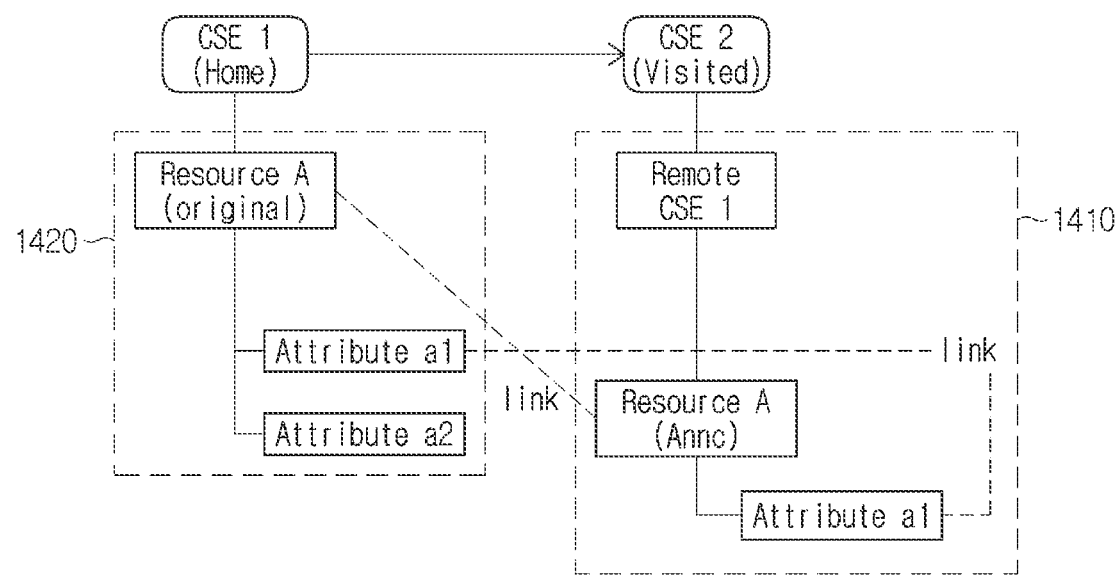
FIG. 14 illustrates a horizontal resource copy type among announced resource types according to the present invention.

FIG. 14 illustrates a horizontal resource copy type among announced resource types according to the present invention. For example, in the case of horizontal resource copy, resource and service 1420 performed in CSE 1 (e.g., Home) may be provided in another equivalent CSE 2 (e.g., Visited) based on copied resource 1410. Thus, the service may be provided more rapidly. Herein, unlike the existing announcement function, since a service is provided based on an announced resource, the access control authority for the original resource 1420 is limited. For example, as the access control authority, the access to the original resource 1420 itself may be blocked.

Figure 15:
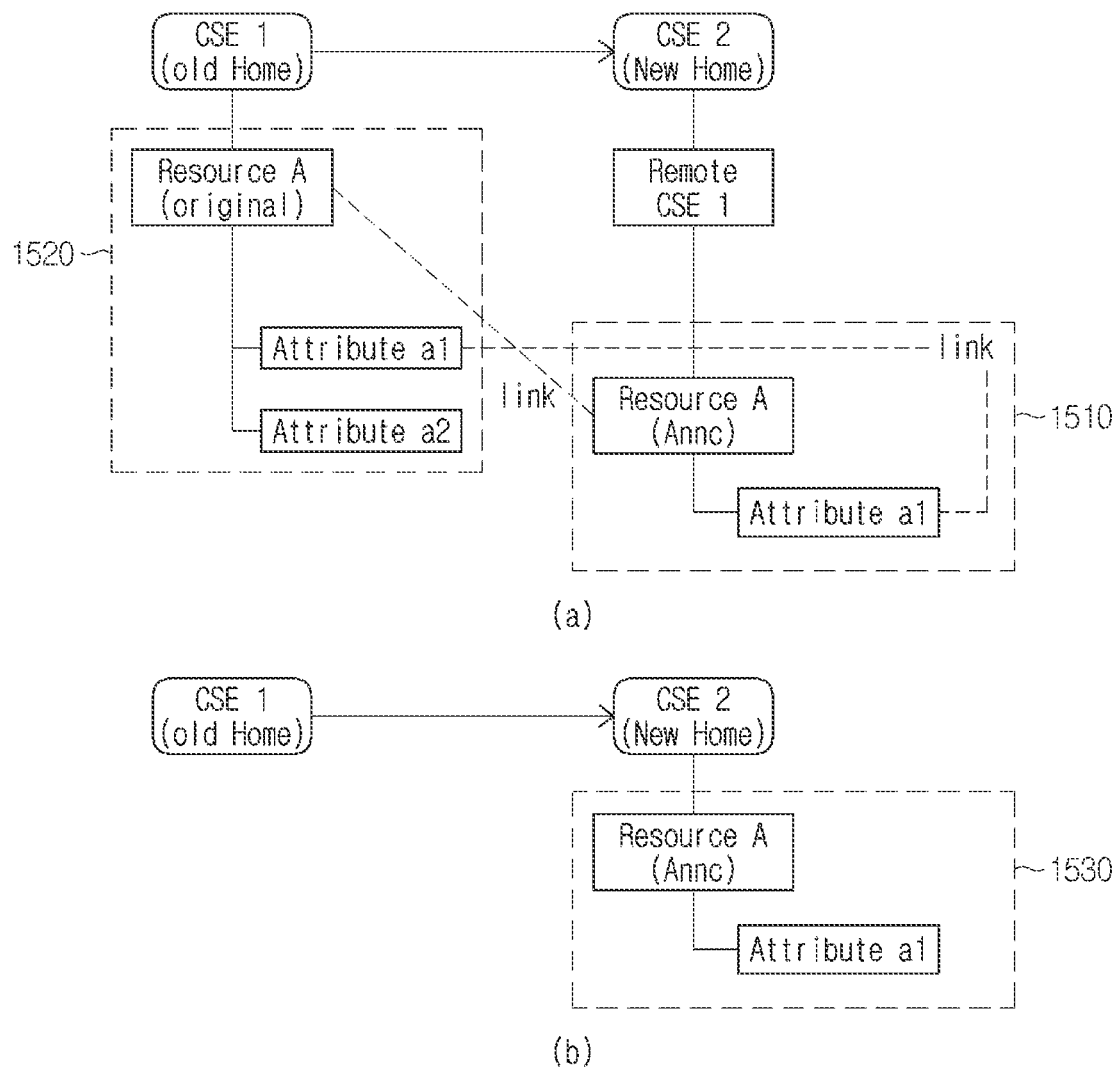
FIGS. 15A-15B illustrate a transfer type among announced resource types according to the present invention.

FIGS. 15A-15B illustrate a transfer type among announced resource types according to the present invention. For example, FIG. 15A assumes that AE or Resource A 1520 moves from a region with service of CSE 1 (e.g., old Home) to another region. Herein, a case is illustrated in which AE registers its resource again in a nearby CSE 2 (e.g., new Home) to use a service for the resource A. Herein, when information already registered in CSE 1 is available, a simpler re-registration process may replace an existing one. For example, after Resource A is completely copied into CSE 2, when an original resource is deleted, a transfer function may be implemented. Herein, after the transfer function is completed, as illustrated in FIG. 15B, Resource A 1530 of CSE 2 needs to be changed not to an announced resource but to an original resource so that it is located right under not remote CSE 1 but CSE 2.

Figure 16:
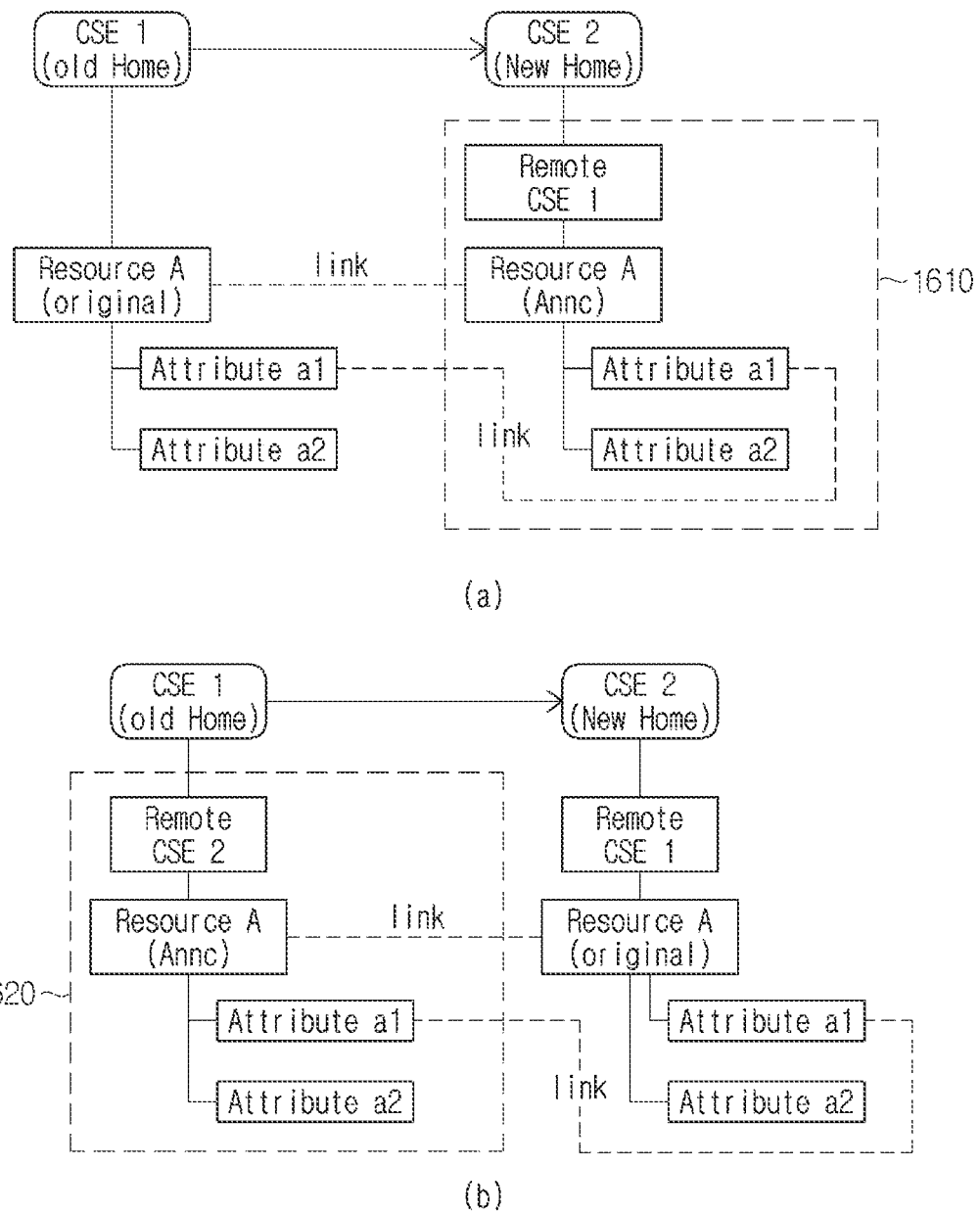
FIGS. 16A-16B illustrate a shift type among announced resource types according to the present invention.

FIGS. 16A-16B illustrates a shift type among announced resource types according to the present invention. It is also possible to define the shift type as an alteration of the above-described transfer type. For example, FIG. 16A illustrates a shift type that alters a role of Resource A after copying a resource to CSE 2 (1620). That is, in FIG. 16B, Resource A of CSE 2 takes the role of an original resource and the role of Resource A of CSE 1 is altered to an announced resource (1620). For this, Resource A of CSE 2 is located right under CSE 2 not remote CSE 1. On the other hand, Resource A of CSE 1 needs to be located below Remote CSE 2 (1620).

Figure 17:
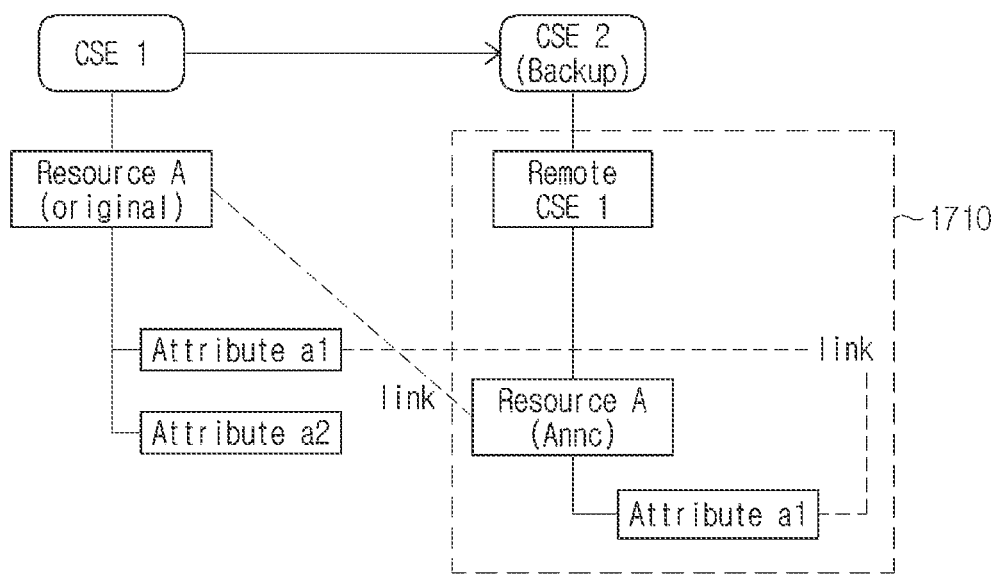
FIG. 17 illustrates a backup type among announced resource types according to the present invention.

FIG. 17 illustrates a backup type among announced resource types according to the present invention. To achieve the purpose of resource backup, a resource may be copied to a remote CSE. Unlike other scenarios, even when the original resource A of CSE 1 is deleted, it is desirable that a backup resource 1710 is not deleted according to a predefined policy. In addition, when there is a backup resource, even if the original resource A is deleted, it is desirable that information on the backup resource exists in CSE 1. In addition, it is desirable that access to a backup resource is limited except by special authority or in a predetermined case. For example, RETRIEVE authority for backup resource 1710 needs to be limited.

Figure 18:
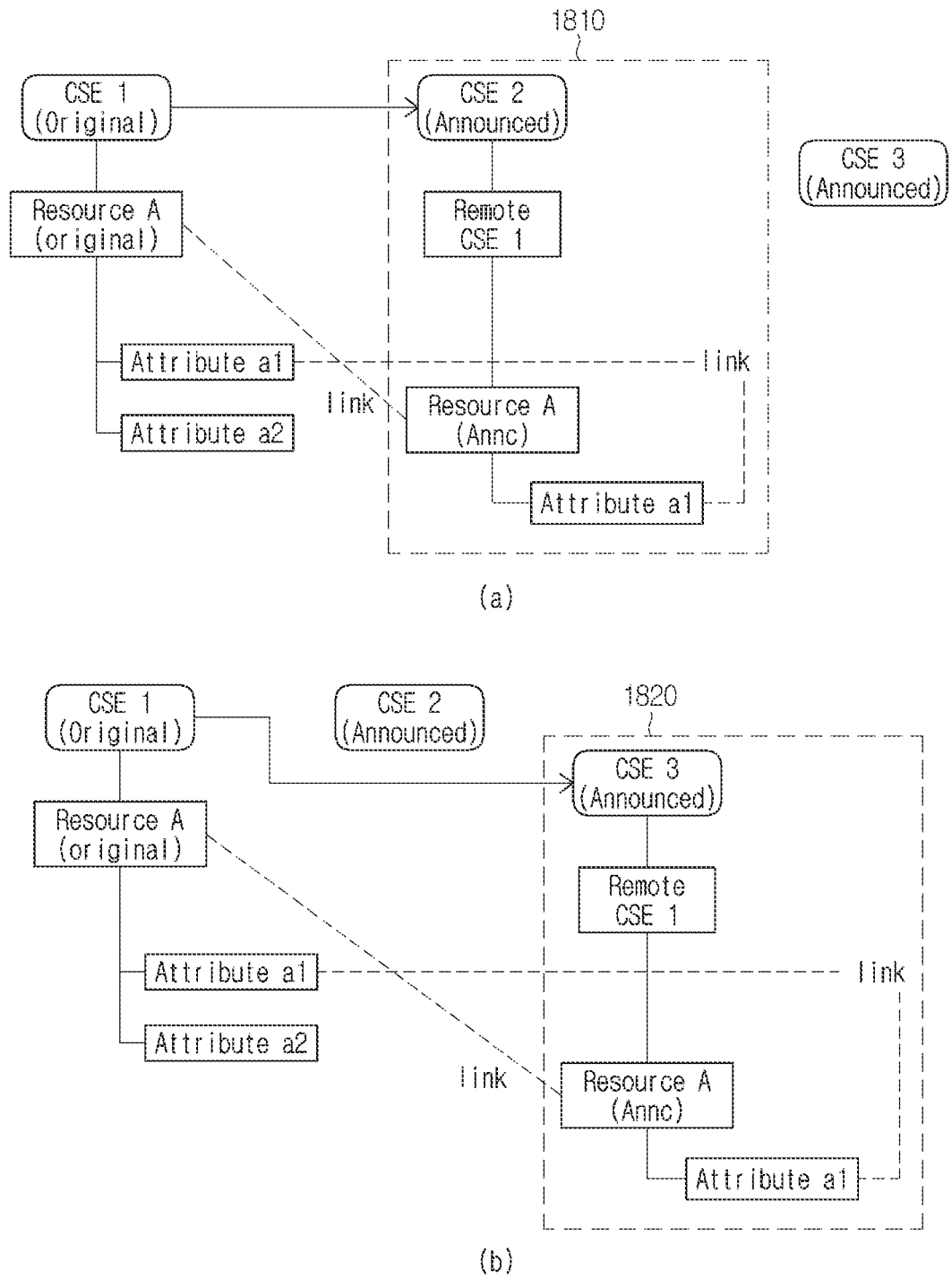
FIGS. 18A-18B illustrate a handover type among announced resource types according to the present invention.

FIGS. 18A-18B illustrate a handover type among announced resource types according to the present invention. For example, a resource handover between fog/edge nodes may be required to support mobility of vehicles. In other words, a handover function refers to handing over a copied resource 1810, which has been present in CSE 2, to a copied resource 1820 of CSE 3. Herein, as illustrated in FIG. 18B, the copied resource 1810 of CSE 2 is deleted. Meanwhile, an original resource and the resource 1820 that is newly announced to CSE 3 are connected to each other through a link. When a handover is performed from CSE 2 to CSE 3, whether synchronization is executed between CSE 1 and CSE 2 or after the handover is completed may be determined according to a synchronization policy.

Figure 29:
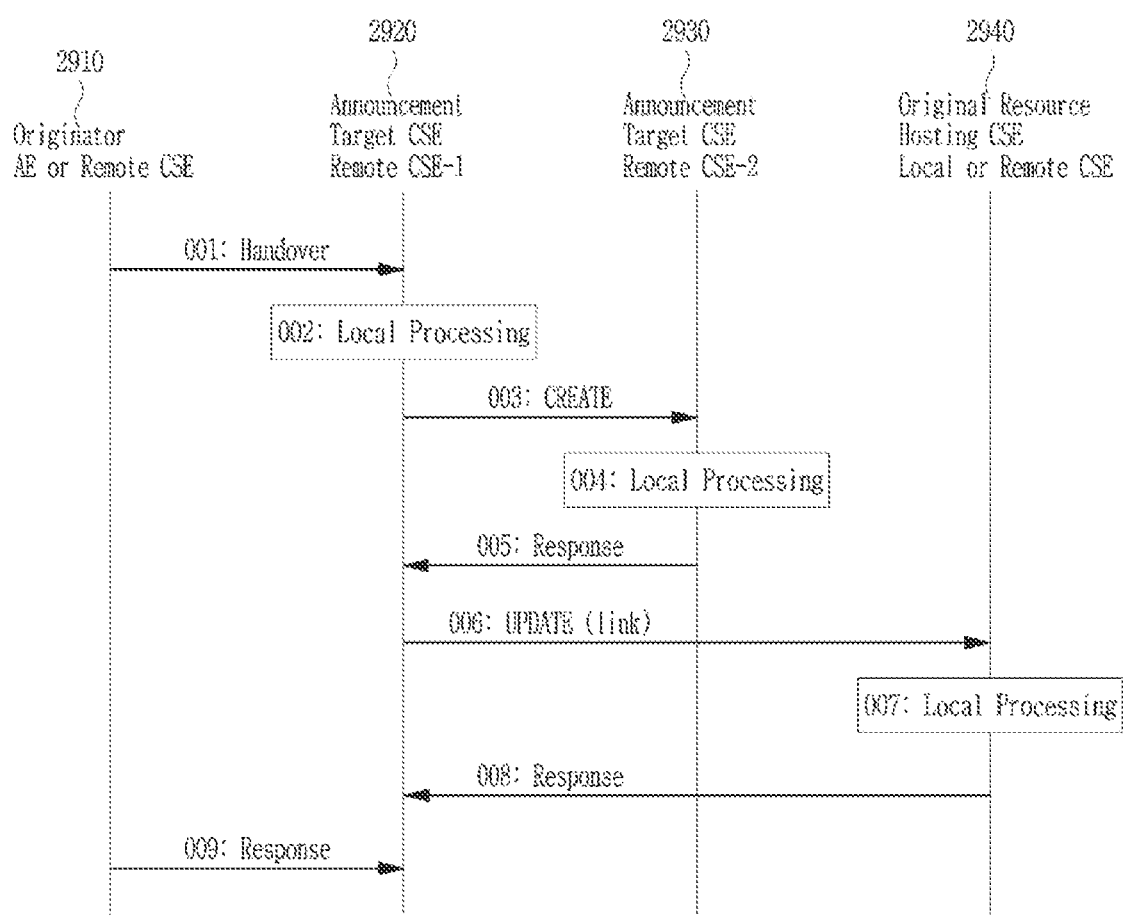
FIG. 29 and FIG. 30 illustrate an example of a process by a handover announced type according to the present invention.
Figure 30:
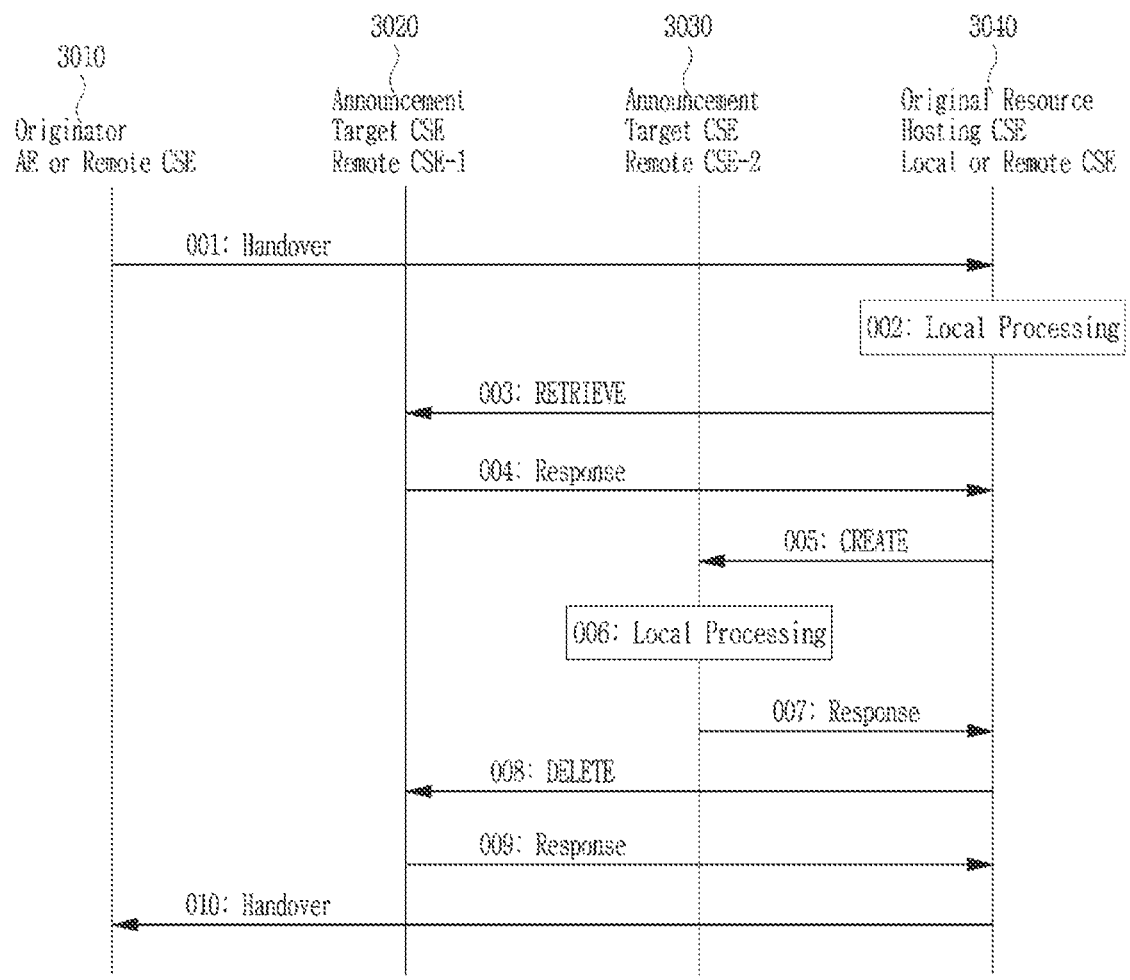

FIG. 29 and FIG. 30 illustrate an example of a process according to the handover announced type. For example, FIG. 29 illustrates a handover process in a case in which an AE or remote CSE 2910, which is a source node, makes a handover request to a target CSE 1 2920 to perform a resource handover from CSE 1 2920 to CSE 2 2930. In other words, when receiving the handover request, the CSE 1 2920 requests a resource handover to the CSE 2 2930 through CREATE Request. Next, when the resource handover is completed in the CSE 2 2930, the CSE 1 2920 requests an original hosting CSE 2940 to have a new link to CSE 1 2930 through UPDATE Request. Next, as the hosting CSE 2940 creates a new link to the CSE 2 2930, the resource handover process is completed.

In addition, for example, FIG. 30 illustrates a handover process in a case in which an AE or remote CSE 3010, which is a source node, makes a handover request to a hosting CSE 3040 to perform a resource handover from CSE 1 3020 to CSE 2 3030. In other words, when receiving the handover request, the hosting CSE 3040 requests resource retrieve to the CSE 1 3020 through RETRIEVE Request. Next, the hosting CSE 3040 requests the CSE 2 3030 to create or generate a relevant resource through CREATE Request. Next, when the resource handover is completed in the CSE 2 3030, the hosting CSE 3040 requests the CSE 1 3020 to delete resource through DELETE Request. In response to the request, resource deletion is performed in the CSE 1 3020. Next, the resource handover process is completed when the hosting CSE 3040 creates a new link to the CSE 2 3030.

Figure 19:
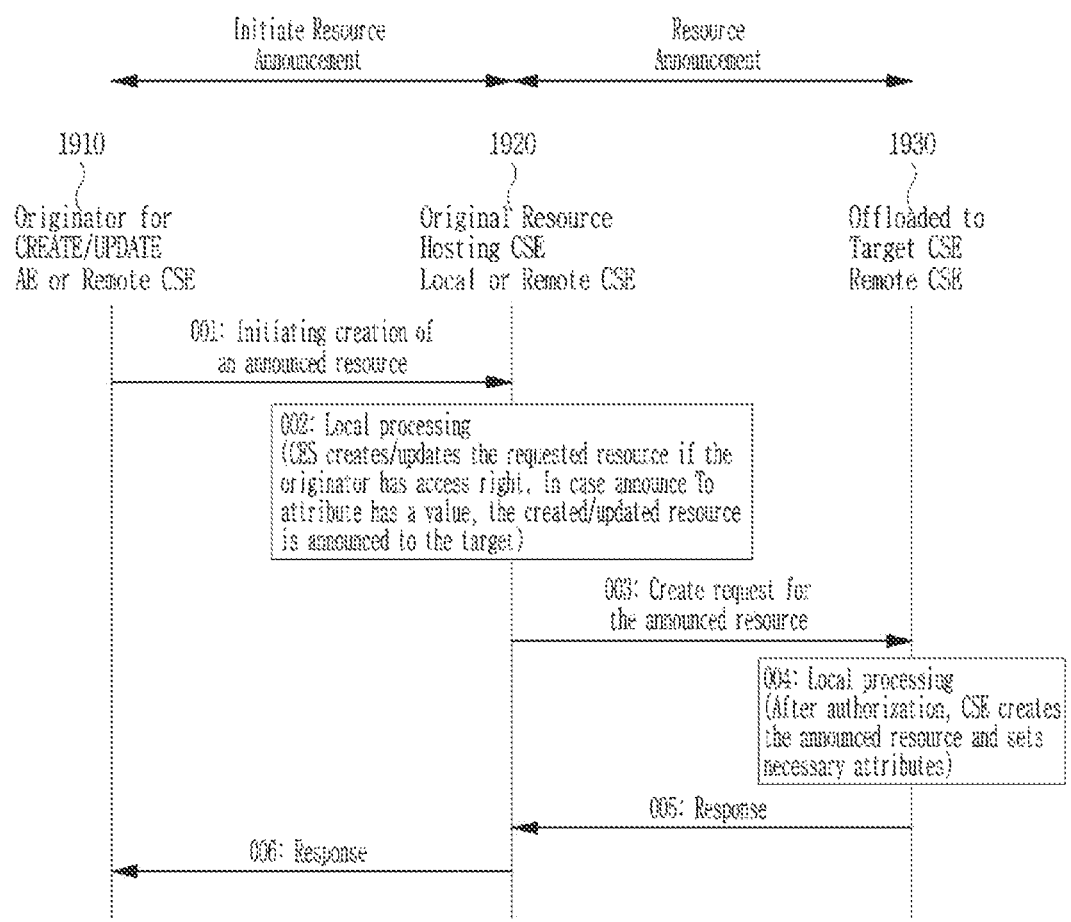
FIG. 19 to FIG. 21 illustrate an example of a process of creating an announced resource among methods for performing resource relocation according to the present invention.

FIG. 19 illustrates an example of a process of generating an announced resource among methods for performing resource relocation according to the present invention. Herein, the announced resource may include a resource that is created by resource offloading. For example, an AE or remote CSE 1910 may become an originator requesting creation or update of an announced resource. In addition, for example, a hosting CSE 1920 may become a CSE including a source resource (or original resource) and may be either a local CSE or a remote CSE. In addition, for example, a target CSE 1930 may become a target CSE to which the source resource is announced, and it may be a remote CSE.

The originator 1910 transmitting a request message for initiating resource announcement may be an AE or a CSE. For example, two methods may be supported to initiate creation of an announced resource. First, the originator 1910 may be configured to initiate generation of an announced resource, while an original resource is being created, by providing an announceTo attribute to CREATE Request. In addition, the originator 1910 may be configured to initiate generation of an announced resource by using UPDATE Request that updates an announceTo attribute to an original resource.

For example, the AE 1910 may be configured to identify the target CSE 1930 for resource announcement. The target CSE 1930 may be automatically identified by the above-described VRU service of FIG. 6 or may be identified as the AE 1910 searches for or requests an appropriate target CSE 1930. In addition, when the target CSE 1930 for resource announcement is identified, the AE 1910 may be configured to request the hosting CSE 1920 to create an announced resource. Herein, for the announced resource creation, an announced resource creation request frame or message ("CREATE Request") may be used. Herein, the CREATE Request may include information on the specific target CSE 1930 in the above-described announceTo attribute of an announced resource. Accordingly, the target CSE 1930 may be designated by the AE 1910.

In addition, the hosting CSE 1920 receiving the CREATE Request verifies whether the AE 1910 is a reliable node and, when the AE 1010 is a reliable node, generates an announced resource in response to the CREATE Request. Herein, the hosting CSE 1920 may define the attributes of the announced resource by referring to the CREATE Request. For example, it is possible to determine one of the announced resource types disclosed in Table 8 above and to set attributes disclosed in Table 9 above. Next, it requests the target CSE 1930 designated by the CREATE Request to perform resource announcement.

When the resource announcement is completed, the target CSE 1930 transmits a completion response to the hosting CSE 1920. In addition, the hosting CSE 1920 transmits a completion response to the AE 1910. In addition, the AE 1910 may be configured to request an update of an announced resource by using an announced resource update request frame or message ("UPDATE Request"). A process by the UPDATE Request may be performed as the same process of the CREATE Request.

In relation to this, the originator 1910 may provide information on announceType, synchMode and postanncAccessMode. In addition, the originator 1910 may provide accessControlPolicyIDs information on an original resource and an announced resource. Specifically, when announceType is Copy, Handover, and Transfer, it is desirable that a single address is included in an announceTo attribute. When no single address is included, an unsuccessful response together with information corresponding to a receiver is transmitted to the originator. However, when announceType designates an existing announcement, updating another attribute to an announceTo attribute of an announcement type may be allowed. In addition, when announceType is Copy or Transfer, it is desirable that an attribute of an original resource is marked with MA except when it is marked with NA.

When announceType is Backup, it may not match an expirationTime attribute of an originator. Accordingly, except in a special case, the expirationTime attribute may be considered to be nonexistent. In addition, when announceType is Transfer, it does not match an expirationTime attribute of an originator. Accordingly, except in a special case, the expirationTime attribute may be considered to be nonexistent. In addition, when announceType is Backup, acessControlPolicyIDs are limited to an originator of an original resource, unless otherwise specified.

Meanwhile, when announceType is Transfer, after transmitting a response message for successful announcement, an announced resource comes to have a status as an original resource. Accordingly, a mark indicating announce (e.g., "annc") is deleted, and a resource, which was under a remote original resource hosting CSE, is under an announcement target CSE. In addition, when announceType is Transfer, an original resource will be deleted when a successful announcement response is received. On the other hand, when announceType is Shift, an original resource will change its status to an announced resource when a successful announcement response is received.

Figure 20:
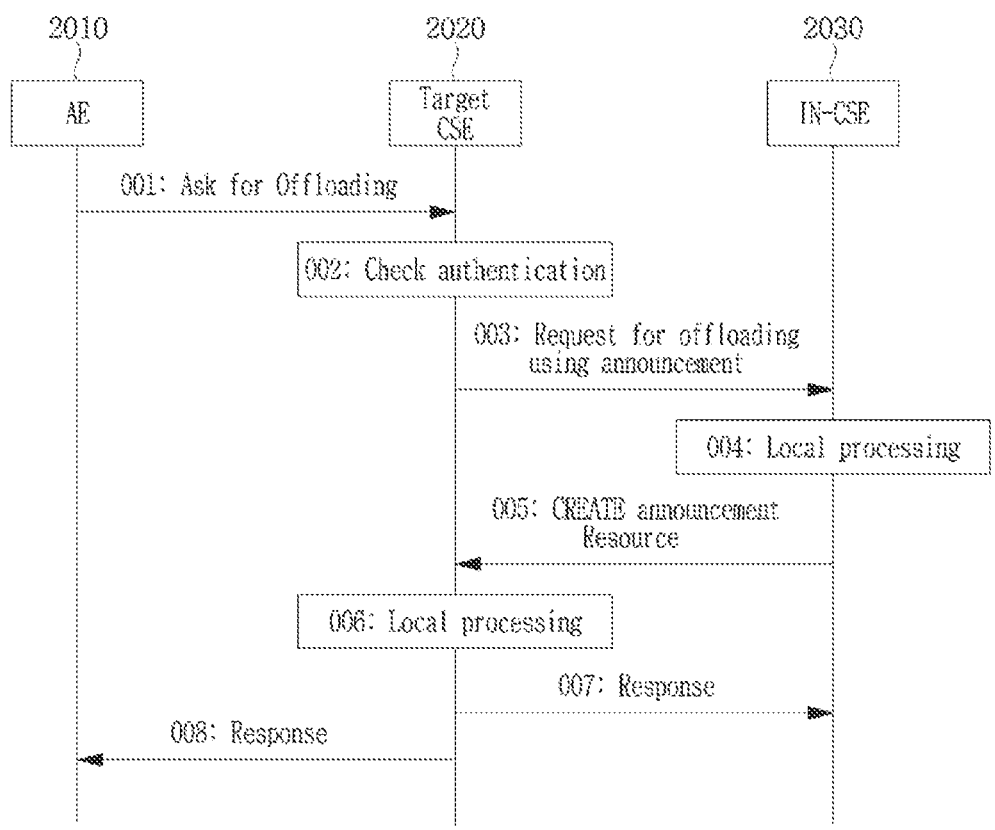
Figure 21:
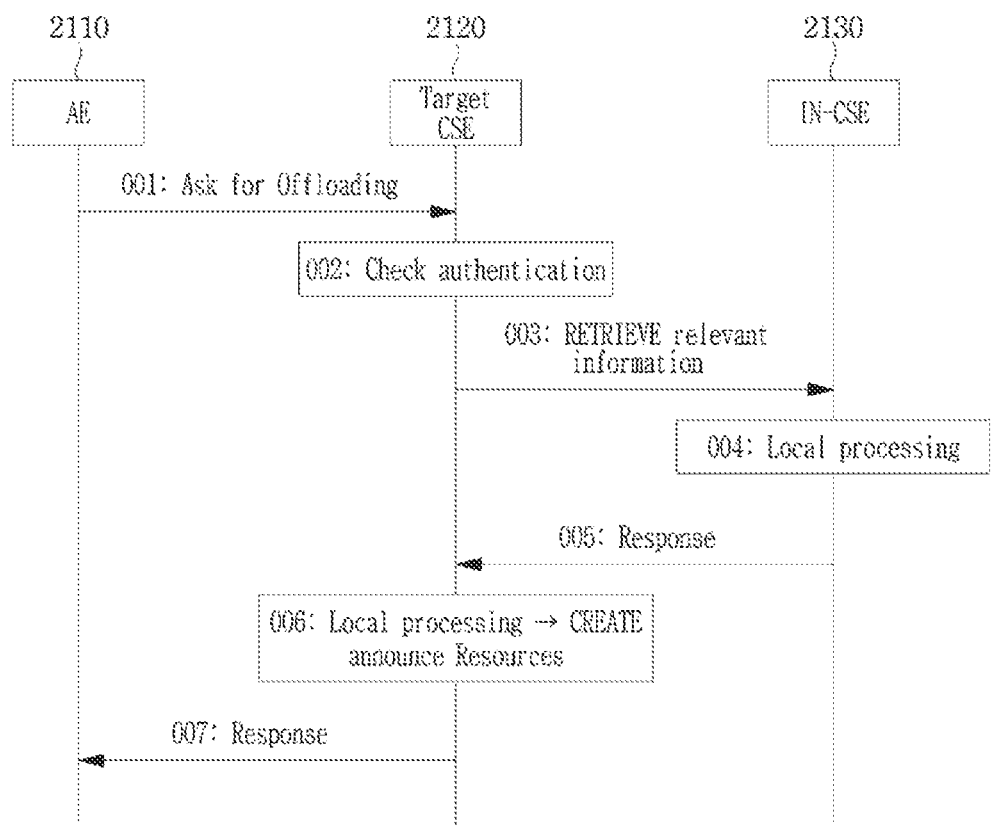

FIG. 20 and FIG. 21 illustrate an example of a process of generating an announced resource among methods for performing resource relocation according to the present invention. In particular, FIG. 20 shows a first process in which a transferable AE creates an announced resource for AE transfer. In addition, FIG. 21 shows a second process in which a transferable AE creates an announced resource for AE transfer. In other words, target CSEs 2020 and 2120 receiving offloading requests from AEs 2010 and 2110 may make a request for announcement or loading of a relevant resource to IN-CSEs 2030 and 2130. Herein, it is also possible to request a resource for AE transfer at the same time.

For example, in the first process of FIG. 20, the target CSE 2020 may make a request through an offloading request among announcement methods, and the IN-CSE 2030 may be configured to generate a CREATE announcement resource message in response to the offloading request. When receiving the CREATE announcement resource message, the target CSE 2020 may be configured to generate an announced resource for AE transfer.

Figure 31:
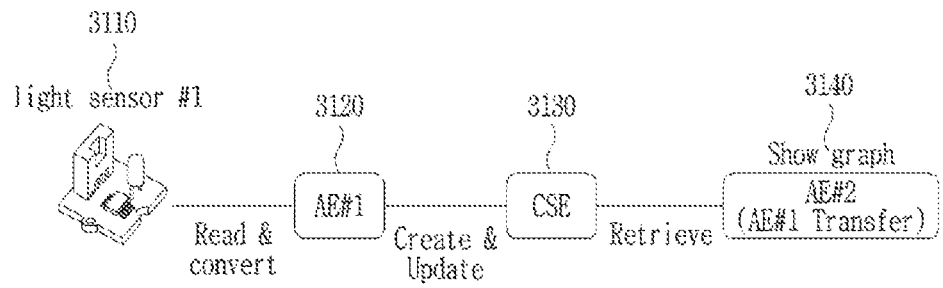
FIG. 31 to FIG. 33 illustrate an example of an AE transfer scenario according to the present invention.
Figure 32:
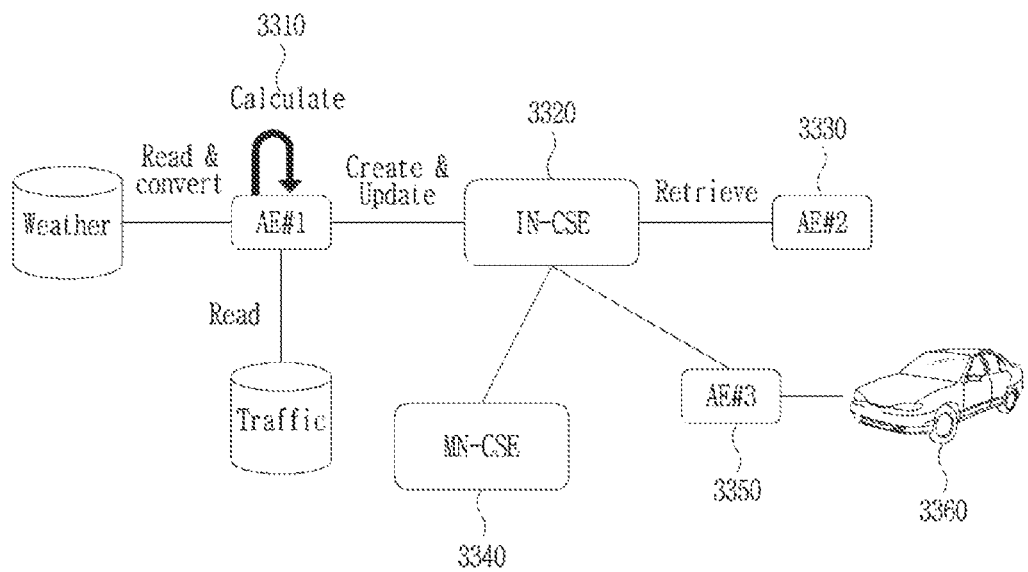
Figure 33:
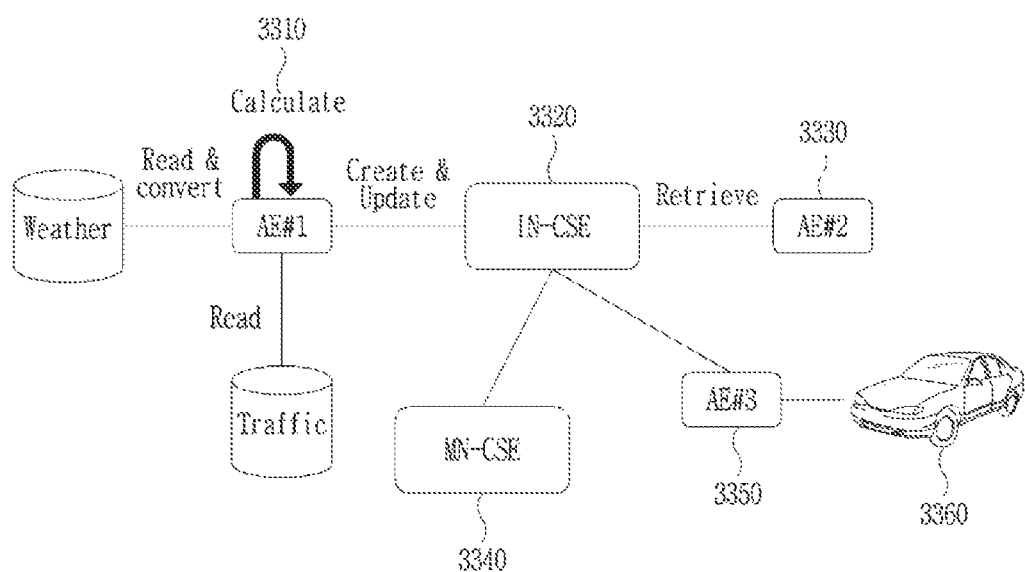

For example, in the second process of FIG. 21, the target CSE 2120 may make a RETRIEVE Request, and the IN-CSE 2130 may provide a relevant resource in response to the RETRIEVE Request. Next, the target CSE 2120 may be configured to generate an announced resource for AE transfer. Herein, "AE transfer" refers to a case in which not only a resource but also an AE itself is transferred during resource announcement or resource offloading. FIG. 31 to FIG. 33 illustrate an example of an AE transfer scenario.

Referring to FIG. 31, a light sensor #1 3110 and AE #1 3120 are physically connected. In addition, AE # 3120, as a software algorithm, for example, may be programmed to obtain a sensing value of the light sensor 3110. Herein, after obtaining the sensing value of the light sensor 3110, AE #1 3120 may be configured to convert the sensing value to be suitable for a corresponding resource in a CSE 3130. The CSE 3120 and also the AE #1 software itself may be transferred to AE #2 3140. For example, by AE #1 3120 transfer, AE #2 3140 may be configured to derive an output (e.g., a graph) using the sensing values. In addition, the AE #1 3120 software itself may also be transferred to the CSE 3130. For example, by AE #1 3120 transfer, the CSE 3130 may be configured to derive an output (e.g., a graph) using the sensing values.

FIG. 32 illustrates another scenario of AE transfer. AE #1 3210 may be a software program that obtains and processes weather or traffic information. Herein, the AE #1 3210 software may be directly transferred to IN-CSE 3220. Accordingly, as AE #1 is transferred, the IN-CSE 3220 itself may be configured to process or manage weather information or traffic information. In addition, AE #1 may be transferred to AE #2 3230, MN-CSE 3240 and AE #3 3250 through the IN-CSE 3220.

FIG. 33 illustrates yet another scenario of AE transfer. AE #1 3310 may be a software program that obtains and processes weather or traffic information. Herein, the AE #1 3310 software may be directly transferred to MN-CSE 3340. Accordingly, as AE #1 is transferred, the MN-CSE 3340 itself may be configured to process or manage weather information or traffic information. In addition, AE #1 may also be transferred to AE #2 3330, IN-CSE 3320, AE #3 3350, and a mobility terminal 3360 through MN-CSE 3340.

In relation to this, an AE may be identified according to whether the AE transfer function is available. For example, a first AE may be defined as an AE for which AE transfer is possible, and a second AE may be defined as an AE for which AE transfer is impossible. In addition, identification information capable of identifying the first AE and the second AE may be defined as AE resource attribute information. Table 10 discloses an exemplary method of defining "transferable" attribute information within an AE resource.

TABLE 10

| Attributes of <AE> | Multiplicity | Description | <AEAnnc> Attributes |
|---|---|---|---|
| transferable | 1 | Indicate that this AE is transferable | NA |

Accordingly, only an AE in which the "transferable" attribute is set to 1 may be controlled so that the above-described AE transfer may be performed.

Figure 22:
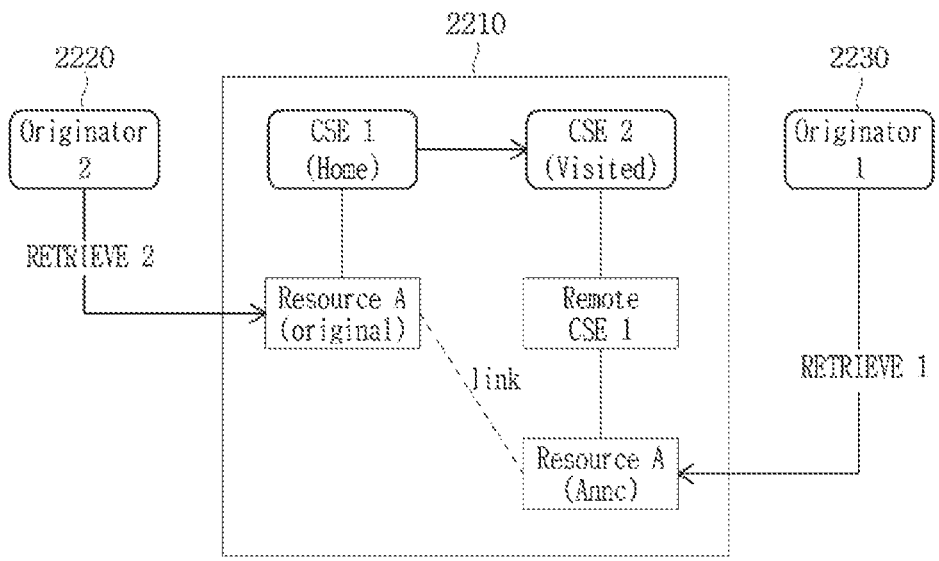
FIG. 22 to FIG. 24 illustrate an example of a scenario and process of retrieving an announced resource among methods for performing resource relocation according to the present invention.
Figure 23:
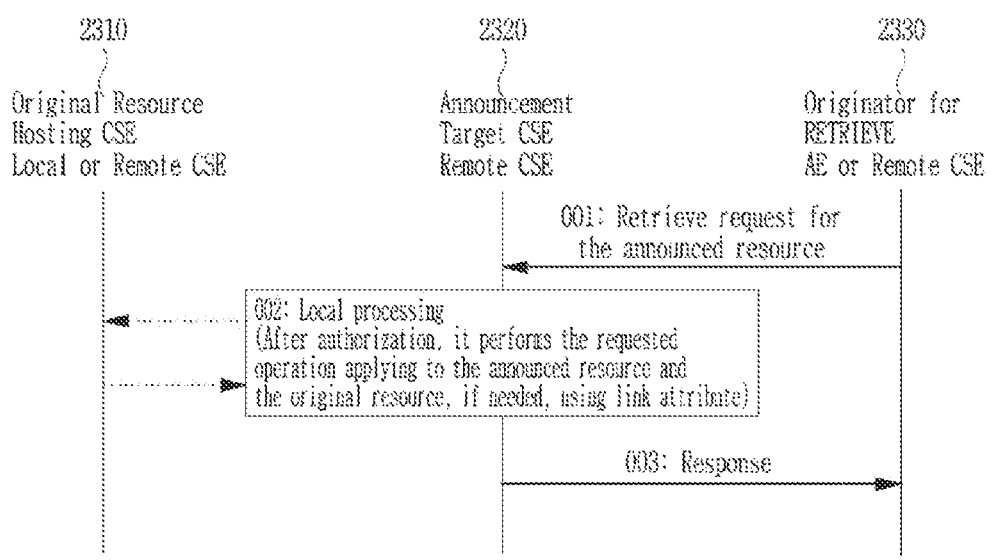
Figure 24:
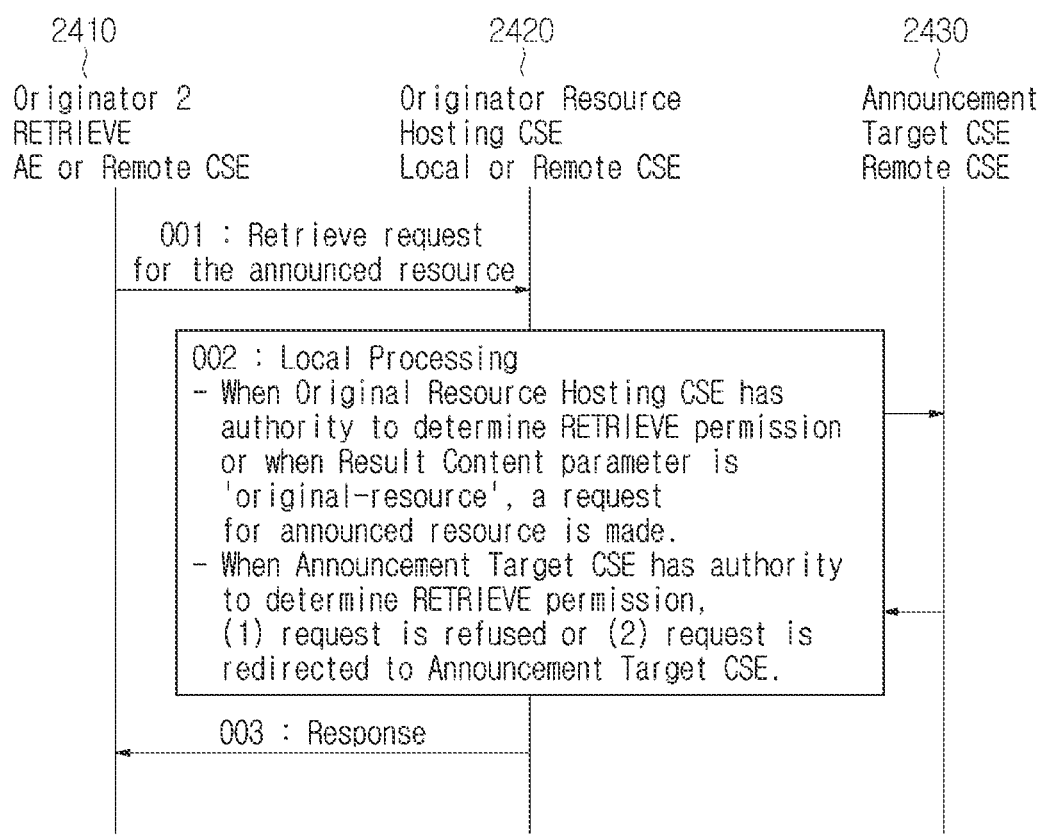

FIGS. 22 to 24 illustrate an example of a scenario and process of retrieving an announced resource among methods for performing resource relocation according to the present invention. Herein, the announced resource may include a resource that is generated by resource offloading. FIG. 22 illustrates an example of RETRIEVE scenario. For example, a case in which resource announcement is completed is assumed (2210).

A first scenario is a case in which Originator 1 2230 requests RETRIEVE of an announced resource. Herein, a measure is required for a case where access to an original resource in CSE 1 is blocked. A second scenario is a case in which Originator 2 2210 requests RETRIEVE of an original resource. In particular, a measure is required concerning whether to allow RETRIEVE for a backup resource.

FIG. 23 illustrates a process corresponding to the first scenario. Originator 2330 may make a RETRIEVE Request for an announced resource to a target CSE 2320. Herein, when receiving the RETRIEVE Request, the target CSE 2320 may respond according to each announced type as follows.

For example, when the announcement type is Vertical copy (Offloading), Horizontal copy, or Handover, and when PostAnncAccessMode is set to Block, even if Result Content parameter is set to "original-resource", Announcement Target CSE 2320 retrieves "announced resource" together with announceType. In addition, when the announcement type is Transfer or Shift, even if Result Content parameter is set to "original-resource", Announcement Target CSE 2320 retrieves "announced resource" together with announceType.

In addition, when the announcement type is Backup, RETRIEVE Request for an announced resource with announceType being backup is refused in principle. However, when an original resource makes an announcement, if a RETRIEVE authority for an announced resource that is backed up is separately specified to an originator, RETRIEVE may be allowed. In addition, when Result Content parameter is set to "original-resource", it may be redirected to an original resource via a link.

FIG. 24 illustrates a process corresponding to the second scenario. In other words, for example, in the case of general announcement, since RETRIEVE for an original resource is naturally allowed, no separate specification is needed. However, in the case of the extended announcement proposed by the present invention, since there is a case in which access to an original resource is set to "Block", an explicit measure is required concerning how to process a RETRIEVE request for the original resource.

Referring to FIG. 24, Originator 2410 may be configured to make a RETRIEVE Request for an original resource to a hosting CSE 2420. Herein, when receiving the RETRIEVE Request, the hosting CSE 2420 may respond according to each announced type as follows. For example, when the announcement type is Vertical copy (Offloading), Horizontal copy, or Handover, even if Original resource has access authority for an original resource, as the status is "Block", the request is refused or is redirected to Announcement Target CSE 2430.

In addition, when the announcement type is Transfer, since Original resource is deleted, it is possible to refuse a request. On the other hand, when the announcement type is Shift, a request is redirected to Announcement Target CSE 2430. In addition, when the announcement type is Backup, and when Originator has access authority for an original resource, a RETRIEVE request is responded.

Figure 25:
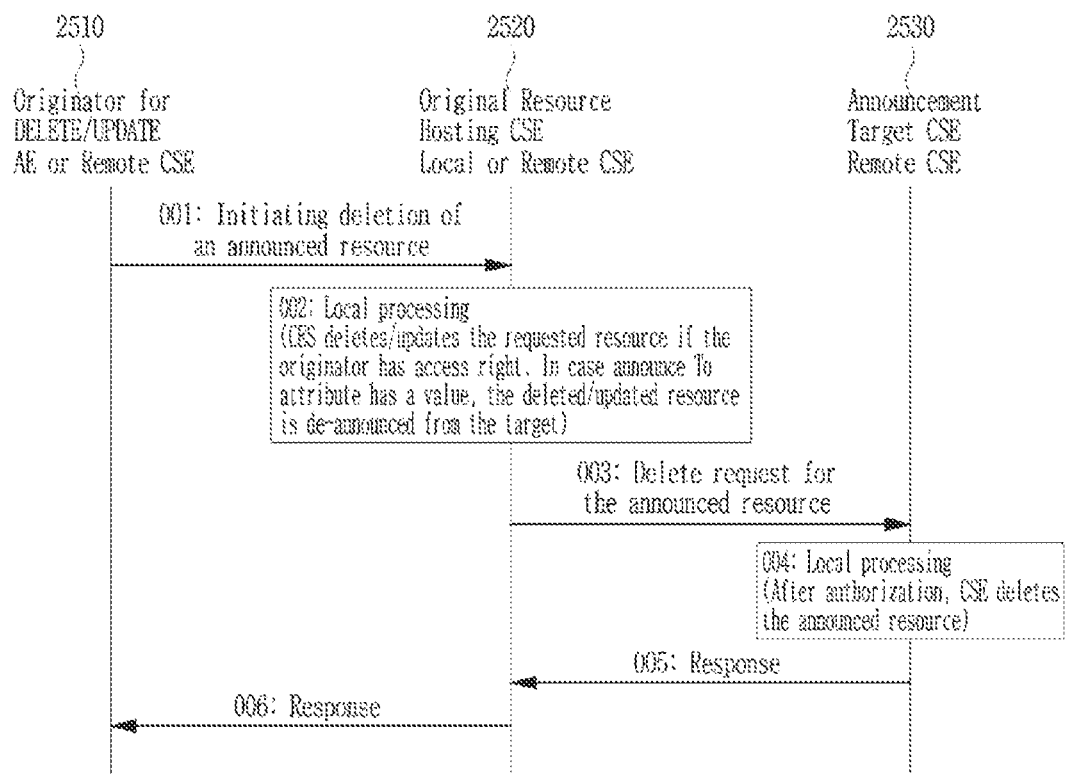
FIG. 25 illustrate an example of a process of deleting an announced resource among methods for performing resource relocation according to the present invention.

FIG. 25 illustrate an example of a process of deleting an announced resource among methods for performing resource relocation according to the present invention. Herein, the announced resource may include a resource that is generated by resource offloading.

An AE or remote CSE may be Originator 2510 requesting deletion (DELETE) of an announced resource. When receiving the DELETE request of the announced resource, a hosting CSE 2520 may be configured to request a target CSE 2530 designated by an announceTo attribute to de-announce the announced resource. In response to the request of the hosting CSE 2520, the target CSE 2530 may be configured to delete the announced resource. Herein, although the AE or remote CSE 2510 is capable of deleting the announced resource using the DELETE request, it is also possible to utilize an UPDATE request. Table 11 and Table 12 disclose the process in detail.

TABLE 11

| | Initiate Resource De-Announcement: UPDATE or DELETE |
|---|---|
| Processing at the Originator before sending Request | The Originator shall perform one of the following for the deletion of an announced resource: The Originator shall request to update the announceTo attribute at the original resource Hosting CSE by providing new content of the announceTo attribute which does not include the CSE-IDs of the announcement target CSEs where the announced resource needs to be de-announced (deleted) by the UPDATE operation. The Originator shall request to delete the announceTo attribute at the original resource Hosting CSE by sending UPDATE Request that sets the value of the announceTo attribute to NULL for the deletion of all announced resources. For DELETE operation, the Originator shall include the resource address of the original resource Hosting CSE that needs to be deleted, in the DELETE Request. Content: Void. |
| Processing at the Receiver | Once the Originator has been successfully authorized, the Receiver (which shall be the original resource Hosting CSE) shall grant the Request after successful validation of the Request. The Receiver shall be the resource Hosting CSE. On receiving the UPDATE or DELETE Request, the Receiver shall perform as follows: For UPDATE Request, the Receiver shall request to delete the announced resource(s) whose address(es) is/are not included in the announceTo attribute of the request For DELETE Request, the Receiver shall request to delete all announced resources in the announceTo attribute |
| Information in Response message | On successful completion of resource de-announcement procedure, the Receiver knows that the announced resource has been deleted: The Receiver shall provide confirmation of resource de-announcement to the Originator. The content of the updated announceTo attribute shall be provided to the Originator to indicate the successfully deleted announced resource, if the announceTo attribute is not deleted by the Originator in the Request message. |

TABLE 12

Resource De-Announcement: DELETE

| | |
|---|---|
| Information in Request message | From: Identifier of the CSE that initiates the Request.<br>To: The address where announced resource needs to be deleted. |
| Processing at the Originator before sending Request | The Originator shall request to delete an announced resource by using the DELETE Request. To: Parameter provides an address that identifies the announced resource to be deleted. |
| Processing at the Receiver | If the value of the From parameter in Request message is identical with the CSE-ID included in the link attribute in the announced resource, the Receiver shall grant the Request after successful validation of the Request: Delete the announced resource identified by the To parameter in the Request.<br>Respond to the Originator with the appropriate DELETE Response. |
| Processing at Originator after receiving Response | The Originator after receiving the Response from the Receiver shall:<br>If the announced resource is successfully deleted, the announceTo attribute in the original resource shall be updated to delete the address for the deleted announced resource. |

In addition, as described above, as the definition of an announced resource is extended, it is also necessary to specify creation and deletion of attributes announcement. In other words, for example, CSE 1 assumes, for the attributes a1/a2 of Resource A, that only a1 of Resource A is announced to CSE 2. In addition, when an originator intends to announce the attribute a2 to CSE 2 by including a2 in an announced attribute, according to the existing announcement, the attribute a2 may be announced without problem.

However, in the case of extended announcement asking for "Block" of an original hosting CSE, it is necessary to provide a measure concerning how to process the request to create attribute announcement. For example, among resource relocation methods, in the cases of Offloading (vertical copy), Local Breakout (horizontal copy), Transfer, and Shift, since it is desirable that only a resource/an attribute necessary for a service is copied, it is not necessary to specify that every resource/attribute is copied. Accordingly, announcement for attribute also needs to be specified.

In addition, even when an original hosting CSE is "blocked", if an originator of an original resource intends to add an attribute, "Block" is not necessary. Accordingly, it is desirable that announcement for adding an attribute is allowed. For the same reason, when a specific attribute is to be deleted, it is desirable that the de-announcement of the attribute is allowed.

Figure 34:
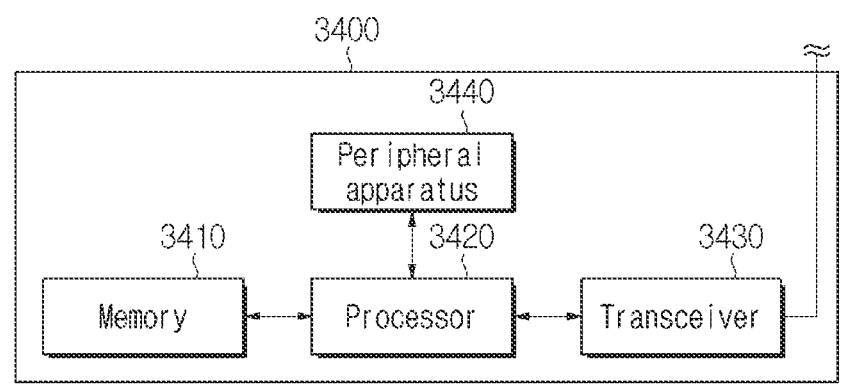
FIG. 34 is a view illustrating an example of an apparatus configuration according to the present invention.

FIG. 34 is a view illustrating an example of an apparatus configuration according to the present invention. Referring to FIG. 34, a device 3400 may include a memory 3400, a processor 3420, a transceiver 3430 and a peripheral apparatus 3440. In addition, for example, the device 3400 may further include another configuration and is not limited to the above-described embodiment. Herein, as an example, the device may be an apparatus operating based on the above-described M2M system. More specifically, the device 3400 of FIG. 34 may be an illustrative hardware/software architecture of an M2M network node such as an M2M device, an M2M gateway and an M2M server. Herein, as an example, the memory 3410 may be a non-removable memory or a removable memory. In addition, as an example, the peripheral apparatus 3440 may include a display, GPS or other peripherals and is not limited to the above-described embodiment. In addition, as an example, the above-described device 3400 may be a node. Herein, like the transceiver 3430, the node may include a communication circuit. Based on this, the node may be configured to perform communication with an external device.

In addition, as an example, the processor 3420 may be at least one of a general-purpose processor, a digital signal processor (DSP), a DSP core controller, a micro controller, application specific integrated circuits (ASICs), field programmable gate array (FPGA) circuits, any other type of integrated circuit (IC), and one or more microprocessors related to a state machine. In other words, it may be a hardware/software configuration playing a controlling role for operating the above-described device 3400. Here, the processor 3420 may be configured to execute computer-executable commands stored in the memory 3410 to implement various necessary functions of node. As an example, the processor 3420 may be configured to execute at least any one operation among signal coding, data processing, power controlling, input and output processing, and communication operation. In addition, the processor 3420 may be configured to control a physical layer, an MAC layer and an application layer. In addition, as an example, the processor 3420 may be configured to execute an authentication and security process in an access layer and/or an application layer but is not limited to the above-described embodiment.

In addition, as an example, the processor 3420 may be configured to perform communication with other devices via the transceiver 3430. As an example, the processor 3420 may be configured to execute computer-executable commands so that a node may be operated to perform communication with other nodes via a network. In other words, communication performed in the present invention may be controlled. As an example, other nodes may be an M2M gateway, an M2M server and other devices. For example, the transceiver 3430 may be configured to transmit a RF signal through an antenna. The transceiver 3430 may be configured to transmit a signal based on various communication networks. In addition, as an example, MIMO technology and beam forming technology may be applied as antenna technology but are not limited to the above-described embodiment. In addition, a signal transmitted and received through the transceiver 3430 may be controlled by the processor 3420 by being modulated and demodulated, which is not limited to the above-described embodiment.

Figure 35:
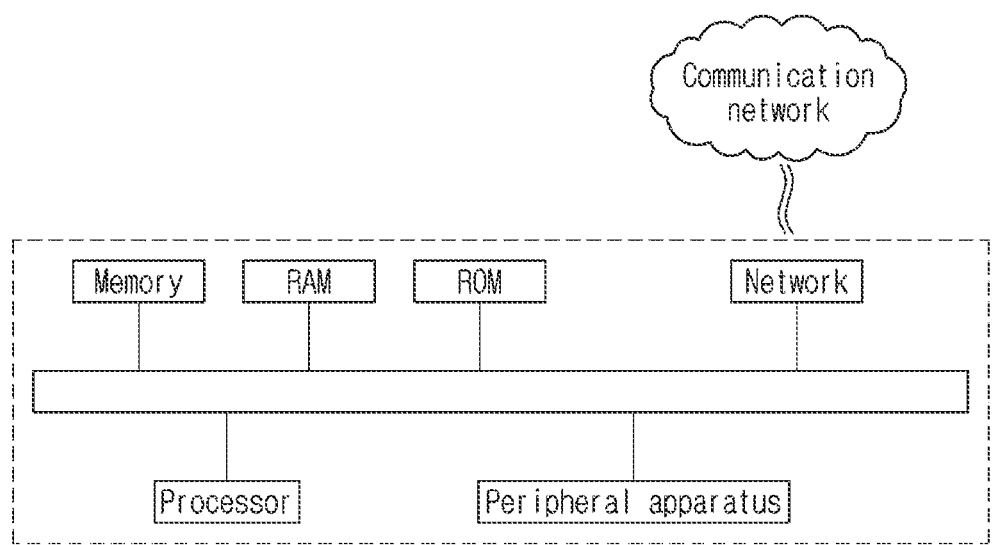
FIG. 35 is a view illustrating another example of an apparatus configuration according to the present invention.

FIG. 35 may be another apparatus configuration for a device. Referring to FIG. 35, as described above, it may be operated by a processor. Herein, as an example, a memory, RAM, ROM and a network may be included. In addition, another movable memory may be further included and is not limited to the above-described embodiment. Herein, the processor may be controlled to execute an instruction based on information stored in the above-described memories and to perform the operations described in the present invention. In addition, a processor may be provided with power by a power supply and be offered input information by peripherals, which is not limited to the above-described embodiment. In addition, as an example, a device may be configured to obtain location information and related information based on GPS and the like. In addition, as an example, a device may be configured to receive input information based on other input devices and is not limited to the above-described embodiment.

The above-described exemplary embodiments of the present invention may be implemented by various means. For example, the embodiments of the present invention may be implemented by hardware, firmware, software, or a combination thereof.

The foregoing description of the preferred embodiments of the present invention has been presented for those skilled in the art to implement and perform the invention. While the foregoing description has been presented with reference to the embodiments of the present invention, it will be apparent to those skilled in the art that various modifications and variations can be made in the present invention without departing from the spirit or scope of the present invention as defined by the following claims. Accordingly, the present invention is not intended to be limited to the embodiments shown herein but is to be accorded the widest scope consistent with the principles and novel features disclosed herein. In addition, while the preferred embodiments of the present specification have been particularly shown and described, it is to be understood that the present specification is not limited to the above-described embodiments, but, on the contrary, it will be understood by those skilled in the art that various changes and modifications can be made without departing from the spirit and scope of the present specification as defined by the claims below, and such changes and modifications should not be individually understood from the technical thought and outlook of the present specification.

In this specification, both the invention and the method invention are explained, and the description of both invention may be supplemented as necessary. In addition, the present invention has been described with reference to embodiments thereof. It will be understood by those skilled in the art that various changes in form and details may be made therein without departing from the essential characteristics of the present invention. Therefore, the disclosed embodiments should be considered in an illustrative rather than a restrictive sense. The scope of the present invention is defined by the appended claims rather than by the foregoing description, and all differences within the scope of equivalents thereof should be construed as being included in the present invention.

INDUSTRIAL APPLICABILITY

The present invention may be applied not only to a oneM2M system but also to various systems.

What is claimed is:

1. A method for performing resource offloading in a first node, the method comprising:
   receiving an offloading request message that requests offloading for a source resource; and
   offloading the source resource to a second node in response to the offloading request message,
   wherein the offloading includes requesting to generate an offloaded resource using the offloaded source resource, and
   wherein the offloaded resource includes a synchronization mode (offloadSync) designating a synchronization method with the offloaded source resource as an offloaded attribute.

2. The method of claim 1, wherein the synchronization mode (offladSync) includes at least any one among a periodic mode (Periodic), an update mode (Update) and a termination mode (Finish).

3. The method of claim 2, wherein, when the synchronization mode is the periodic mode, the first node and the second node are configured to periodically perform synchronization between the source resource and the offloaded resource at every preset synchronization cycle time.

4. The method of claim 3, wherein the offloaded resource further includes cycle information (syncTime) designating a synchronization cycle time used in the synchronization mode as one of offloaded attributes.

5. The method of claim 2, wherein, when the synchronization mode is the update mode, every time an update is performed for the offloaded resource included in the second node, the first node and the second node perform synchronization between the source resource and the offloaded resource.

6. The method of claim 2, wherein, when the synchronization mode is the termination mode, when an offloading service for the offloaded resource terminates in the second node, the first node and the second node perform synchronization between the source resource and the offloaded resource.

7. The method of claim 1, wherein the offloading request message includes information designating the source resource, for which offloading is requested, and information designating a second node in which the offloaded resource is generated.

8. The method of claim 1, wherein the offloaded source resource is managed based on a management policy of the first node.

9. The method of claim 8, wherein the management policy includes a blocking policy, and wherein, when the offloaded source resource included in the first node is managed based on the blocking policy, access to the offloaded source resource is blocked.

10. The method of claim 8, wherein the management policy includes a readable policy, and wherein, when the offloaded source resource included in the first node is managed based on the readable policy, only reading is allowed for the offloaded source resource.

11. The method of claim 8, wherein the management policy includes a writable policy, and wherein, when the offloaded source resource included in the first node is managed based on the writable policy, reading and writing are allowed for the offloaded source resource.

12. The method of claim 1, wherein the offloaded resource further includes link information designating a connection to the offloaded source resource as an offloaded attribute.

13. The method of claim 1, wherein the offloaded resource further includes information (syncResponsibility) assigning responsibility for the synchronization mode to any one of the first node and the second node as an offloaded attribute.

14. The method of claim 1, wherein, when the source resource includes attribute information (offloadTo) designating an offloading target node, the offloading request message designates the second node as an offloading target node using the attribute information (offloadTo).

15. The method of claim 1, wherein the offloaded resource is classified into at least two offloaded resource types according to a type of a target resource to be offloaded.

16. The method of claim 1, wherein the offloaded resource types include an access control policy offload (accessControlOffload) type.

17. The method of claim 16, wherein the offloaded resource types further include an application entity offload (AEOffload) type offloading an application entity (AE) itself.

18. A method for performing offloading method in a second node, the method comprising:
   receiving an offloading request for a source resource from a first node; and
   generating, in response to the offloading request message, an offloaded resource by using the source resource for which offloading is requested,
   wherein the offloaded resource comprises a synchronization mode (offloadSync) designating a synchronization method with the offloaded source resource as an offloaded attribute.

19. An application entity (AE) apparatus, the apparatus comprising:
   at least one or more processors; and
   at least one or more memories coupled to the at least one or more processors,
   wherein the at least one or more processors, which are coupled operably to the at least one or more memories and execute a program instruction stored in the at least one or more memories, transmit an offloading request message, which requests to offload a source resource in a first node to a second node, to the first node and receive information based on an offloaded resource from the second node that generates the offloaded resource using the offloaded source resource according to the offloading request message, and
   wherein the offloaded resource includes a synchronization mode (offloadSync) designating a synchronization method with the offloaded source resource as an offloaded attribute.

* * * * *